US011624814B2

(12) United States Patent  (10) Patent No.: US 11,624,814 B2
Thayer et al.  (45) Date of Patent: Apr. 11, 2023

(54) REMOTE MEASUREMENT OF SHALLOW DEPTHS IN SEMI-TRANSPARENT MEDIA

(71) Applicants: The Regents of the University of Colorado, Denver, CO (US); ASTRA LiTe, Inc., Louisville, CO (US)

(72) Inventors: Jeffrey P. Thayer, Boulder, CO (US); Andrew W. Gisler, Boulder, CO (US); Steven Mitchell, Annapolis, MD (US); Matthew Hayman, Boulder, CO (US)

(73) Assignees: THE REGENTS OF THE UNIVERSITY OF COLORADO, Denver, CO (US); ASTRA LITE, INC., Louisville, CO (US)

( * ) Notice: Subject to any disclaimer, the term of this patent is extended or adjusted under 35 U.S.C. 154(b) by 139 days.

(21) Appl. No.: 16/900,234

(22) Filed: Jun. 12, 2020

(65) Prior Publication Data

US 2020/0309926 A1 Oct. 1, 2020

Related U.S. Application Data

(63) Continuation of application No. 15/092,015, filed on Apr. 6, 2016, now Pat. No. 10,684,362, which is a (Continued)

(51) Int. Cl.
*G01C 3/08* (2006.01)
*G01S 7/499* (2006.01)
(Continued)

(52) U.S. Cl.
CPC .......... *G01S 7/499* (2013.01); *G01C 13/008* (2013.01); *G01S 17/10* (2013.01); *G01S 17/89* (2013.01); *Y02A 90/30* (2018.01)

(58) Field of Classification Search
None
See application file for complete search history.

(56) References Cited

U.S. PATENT DOCUMENTS 3,669,540 A   6/1972   Rattman et al.
4,277,167 A   7/1981   Eppel
(Continued)

FOREIGN PATENT DOCUMENTS

EP   1391382 A2   2/2004
EP   2277776 A2   1/2011
(Continued)

OTHER PUBLICATIONS

Crowley and Rodrigues, "Characteristics of traveling ionospheric disturbances observed by the TIDDBIT sounder", Radio Science, vol. 47, RSOL 22, 2012.
(Continued)

*Primary Examiner* — Mark Hellner
(74) *Attorney, Agent, or Firm* — Messner Reeves LLP; Scott J. Hawranek

(57) ABSTRACT

Through discrimination of the scattered signal polarization state, a lidar system measures a distance through semi-transparent media by the reception of single or multiple scattered signals from a scattered medium. Combined and overlapped single or multiple scattered light signals from the medium can be separated by exploiting varying polarization characteristics. This removes the traditional laser and detector pulse width limitations that determine the system's operational bandwidth, translating relative depth measurements into the conditions of two surface timing measurements and achieving sub-pulse width resolution.

15 Claims, 10 Drawing Sheets

Related U.S. Application Data continuation-in-part of application No. 14/129,925, filed as application No. PCT/US2012/045038 on Jun. 29, 2012, now Pat. No. 9,476,980.

(60) Provisional application No. 62/143,502, filed on Apr. 6, 2015, provisional application No. 61/503,314, filed on Jun. 30, 2011.

(51) Int. Cl.
  *G01C 13/00* (2006.01)
  *G01S 17/89* (2020.01)
  *G01S 17/10* (2020.01)

(56) References Cited

U.S. PATENT DOCUMENTS

| | | | |
|---|---|---|---|
| 4,518,254 | A | 5/1985 | Penny et al. |
| 4,963,024 | A | 10/1990 | Ulich |
| 4,967,270 | A | 10/1990 | Ulich et al. |
| 4,986,656 | A | 1/1991 | Sweeney et al. |
| 5,157,257 | A | 10/1992 | Geiger |
| 5,192,978 | A | 3/1993 | Keeler |
| 5,243,541 | A | 9/1993 | Ulich |
| 5,457,639 | A | 10/1995 | Ulich et al. |
| 5,815,250 | A | 9/1998 | Thomson et al. |
| 6,654,105 | B2 | 11/2003 | Wang et al. |
| 6,928,194 | B2 | 8/2005 | Mai et al. |
| 7,057,199 | B2 | 6/2006 | Perry |
| 7,127,348 | B2 | 10/2006 | Smitherman et al. |
| 7,580,127 | B1 | 8/2009 | Mayor et al. |
| 7,725,258 | B2 | 5/2010 | Smitherman |
| 7,893,957 | B2 | 2/2011 | Peters et al. |
| 7,899,311 | B1 | 3/2011 | Kearney et al. |
| 7,944,548 | B2 | 5/2011 | Eaton |
| 8,054,464 | B2 | 11/2011 | Mathur et al. |
| 8,493,445 | B2 | 7/2013 | Degnan et al. |
| 8,531,650 | B2 | 9/2013 | Feldkhun et al. |
| 9,090,320 | B2 | 7/2015 | Rufo et al. |
| 9,476,980 | B2 | 10/2016 | Thayer et al. |
| 10,684,362 | B2 | 6/2020 | Thayer et al. |
| 2006/0231771 | A1 | 10/2006 | Lee et al. |
| 2008/0137058 | A1* | 6/2008 | Cesare ............ G01S 7/4811 356/4.01 |
| 2009/0073442 | A1 | 3/2009 | Smith |
| 2010/0008588 | A1 | 1/2010 | Feldkhun et al. |
| 2010/0025589 | A1 | 2/2010 | Olcott et al. |
| 2010/0188504 | A1 | 7/2010 | Dimsdale et al. |
| 2010/0296107 | A1 | 11/2010 | Keranen |
| 2016/0223671 | A1 | 4/2016 | Thayer et al. |
| 2016/0259058 | A1 | 9/2016 | Verheggen et al. |
| 2017/0184399 | A1 | 6/2017 | Thayer et al. |
| 2019/0018143 | A1 | 1/2019 | Thayer et al. |

FOREIGN PATENT DOCUMENTS

| | | | |
|---|---|---|---|
| FR | 2971343 A1 * | 8/2012 | ............ G01S 7/499 |
| GB | 2256766 | 12/1992 | |
| JP | 2238391 | 9/1990 | |
| WO | WO 2002/042792 | 11/2001 | |
| WO | WO-0242792 A1 * | 5/2002 | ............ G01S 17/88 |
| WO | WO 2006/004686 | 1/2006 | |
| WO | WO 2013/003771 | 1/2013 | |
| WO | WO 2016/138585 | 9/2016 | |

OTHER PUBLICATIONS

Jacques, Steven et al., Imaging skin pathology with polarized light, Journal of Biomedical Optics 7(3), 329-340, Jul. 2002.

Mitchell, et al. "Polarization lidar for shallow water depth measurement", Optical Society of America, 2010, vol. 49, 6 pages.

Nayegandhi, Lidar Technology Overview, Jun. 2007, available at lidar.cr.usgs.gov/downloadfile2.php?file=Nayegandhi_Lidar_Technology_Overview.pdf, 66 pages.

International Search Report for International (PCT) Application No. PCT/US12/45038, dated Sep. 26, 2012.

Written Opinion for International (PCT) Application No. PCT/US12/45038, dated Sep. 26, 2012, 17 pages.

International Preliminary Report on Patentability for International (PCT) Application No. PCT/US12/45038, dated Jan, 7, 2014, 18 pages.

Extended European Search Report for European Patent Application No. 12804262.9, dated Oct. 9, 2014, 7 pages.

\* cited by examiner

REMOTE MEASUREMENT OF SHALLOW DEPTHS IN SEMI-TRANSPARENT MEDIA

CROSS REFERENCE TO RELATED APPLICATION

The present application is a continuation of U.S. patent application Ser. No. 15/092,015, filed on Apr. 6, 2016, which claims the benefits of and priority, under 35 U.S.C. § 119(e), to U.S. Provisional Application Ser. No. 62/143,502, filed Apr. 6, 2015 and is a continuation-in-part of U.S. patent application Ser. No. 14/129,925, filed Dec. 27, 2013, which is the National Stage of International Application No. PCT/US2012/045038, filed Jun. 29, 2012, which claims the benefits of and priority, under 35 U.S.C. § 119(e) to U.S. Provisional Application Ser. No. 61/503,314, filed Jun. 30, 2011, all of the above-mentioned documents are fully incorporated herein by reference.

FIELD

This invention is directed generally to methods and systems for remote measurement of shallow depths in semi-transparent media, and particularly to methods and systems for measurement of the relative distance between surfaces of differing polarization properties.

BACKGROUND

Light detection and ranging (lidar) bathymetry is a technique capable of measuring the depth of a relatively shallow body of water (e.g., less than 2 meters). A pulsed laser beam is transmitted from the lidar instrument to the body of water. The light generated by the laser beam is typically in the blue-green portion of the spectrum due to the high transmission through water of light at that wavelength. Portions of the laser pulse scatter from the air/water interface, the water volume, and the floor of the water body back to and are collected by the instrument. The times of flight of the detected signals are converted into range measurements and, upon consideration of viewing geometry, propagation paths, and associated errors, permit determination of the probed water depth.

Depth measurement in the shallow water regime is challenging due to system bandwidth limitations of traditional bathymetric lidar techniques. Traditionally the approach used to resolve two scattering objects separated in range is by resolving the difference in travel time of light between the two objects. The limiting factor in resolving the range between targets in traditional systems is dictated by the pulse width of either the laser pulse or the detection electronics, often defined as $c\tau/2n$, where c is the speed of light, n is the index of refraction of the media, and $\tau$ is the limiting pulse width in time (or the inverse of the system bandwidth). Consequently in shallow depth applications the limit of current lidar technologies occurs where ambiguities exist between surface scatterings, volume scattering along the water column, and floor scattering due to system bandwidth limitations associated with laser and/or detector pulse widths. As a result, present day bathymetry lidar systems are limited to depth measurements no shallower than tens of centimeters.

There is a need in the art to improve the precision and other aspects of bathymetry lidar systems.

SUMMARY

Accordingly, the invention is directed to methods and systems for remote measurement of shallow depths in semi-transparent media that substantially obviate one or more of the problems due to limitations and disadvantages of the prior art.

An advantage of the invention is to provide enhanced range resolution and precise measurement in shallow water depth measurement and water floor topography mapping. Further, the invention has capabilities and applications in semi-transparent media thickness measurement and surface topography characterization.

Another advantage is to allow distance sampling with no physical contact with the media.

Yet another advantage is providing a low cost, accurate, self-calibrating, and scalable solution with a differential measurement requiring no knowledge of the lidar system's platform vertical position.

Further yet another advantage is providing a sub-pulse width resolution technique using a lidar system for detecting and characterizing "soft targets" whose optical density becomes sufficiently large to produce multiple scattering effects in the media. For example, measuring water quality as characterized by a level of turbidity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lidar system includes a transmitter configured to output a pulse of polarized light to a medium; the transmitter includes a laser and a polarizer in optical communication with the laser. The lidar system further includes a receiver configured to collect multiple scattered lights from the medium; the multiple scattered lights includes received pulses having varying angular spread or depolarization. The lidar system further includes a first detector, the first detector comprising a sensors array of light sensors. The lidar system further includes a second detector; the second detector comprising a second sensors array of light sensors; the first detector and the second detector are each configured to receive at least a respective component of the multiple scattered lights from the receiver; and the light sensors of the first sensors array and the second sensors array are each configured to receive a respective portion of the received pulses. The lidar system further includes timing electronics coupled to each of the first detector and the second detector; an output of the timing electronics comprises a value indicative of a relative distance based on an amount of time elapsed between inner portions of the received pulses of the multiple scattered lights, thereby achieving a sub-pulse width resolution; optionally the value is based on an optical separation of respective component portions of the multiple scattered lights.

In one aspect, the transmitter further includes a half-wave plate in optical communication with the laser. In another aspect, the transmitter further includes a prism in optical communication with the laser. In another aspect, the laser includes at least one of a polarized laser, pulsed laser, and a continuous wave (CW) laser. In another aspect, the polarized light includes a known polarization. In another aspect, the polarized light includes circular polarization. In another aspect, the receiver includes a telescope. In another aspect, the receiver further includes a spectral filter. In another aspect, the lidar system further includes a polarizing splitter; the first detector and the second detector are in optical communication with the polarizing splitter. In another aspect, the respective component of the received pulses of the multiple scattered lights comprises a cross-planar polarization component and a co-planar polarization component. In another aspect, the first detector is calibrated to receive substantially the cross-planar component and the second detector is calibrated to receive substantially the co-planar component. In another aspect, the first detector and the second detector are each calibrated to the respective portion of the multiple scattered lights.

In another embodiment, a lidar system includes a source of polarized light configured to output a pulse of polarized light and a light receiver configured to receive multiple scattered lights comprising received pulses having varying angular spread or depolarization; the light receiver comprising a polarizing beam splitter; the polarizing beam splitter is configured to split the received pulses into cross-planar polarization components and a co-planar polarization components. The lidar system further includes a first detector including a sensors array of light sensors; the first detector is configured to receive the cross-planar polarization components; and the light sensors of the sensors array are each configured to receive a respective component of the cross-planar polarization components. The lidar system further includes a second detector including a second sensors array of light sensors; the second detector is configured to receive the co-planar polarization component; and the light sensors of the second sensors array are each configured to receive a respective component of the co-planar polarization component. The lidar system further includes timing electronics coupled in electrical communication with the first detector and the second detector configured to output a value indicative of a relative distance based on an amount of time elapsed between inner portions of the received pulses of the multiple scattered lights, thereby achieving a sub-pulse width resolution.

In one aspect, the source of polarized light includes a laser, a half-wave plate, and a polarizer. In another aspect, the laser is selected from the group consisting of a polarized laser, pulsed laser, and continuous wave (CW) laser. In another aspect, the first detector and the second detector each includes a photomultiplier tube, the photomultiplier tube counts photons in the cross-planar polarization component and the co-planar polarization component, respectively.

The present disclosure can provide a number of advantages depending on the particular aspect, embodiment, and/or configuration. These and other advantages will be apparent from the disclosure. Additional features and advantages may be learned by the practice of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
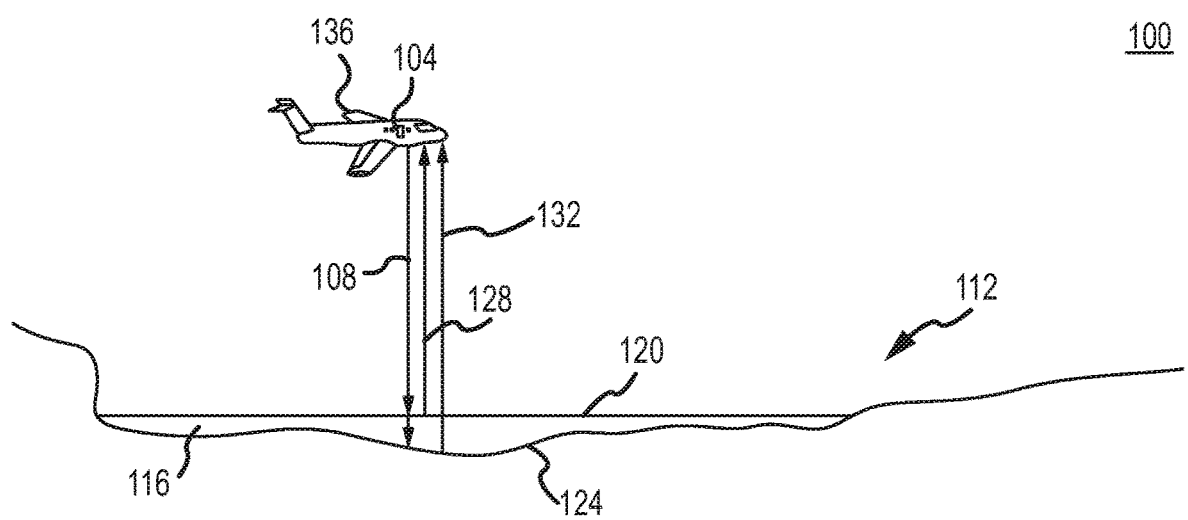
FIG. 1 illustrates a lidar system in accordance with embodiments of the present invention, in an exemplary operating environment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label

DETAILED DESCRIPTION

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "resolution" relates to a degree of discernibility or distinguishability between two objects or events (e.g., light pulses).

The term "intrapulse" relates to events occurring within a single pulse length, also referred to as sub-pulse.

The term "interpulse" refers to the relation between two or more pulses that could be overlapping or separate in time.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

Embodiments herein presented are not exhaustive, and further embodiments may be now known or later derived by one skilled in the art.

The invention relates to a lidar system. A lidar system is configured to measure the distance or other properties of a target surface by illuminating the target surface with light. In one embodiment, the lidar system of the present invention is configured to measure shallow depths of semi-transparent media media includes a first surface and a second surface and the body of the media in-between the first and second surfaces. In a vertical orientation, the first and second surfaces of the media may be the top and bottom surfaces, respectively. Light transmitted is partially scattered from and partially refracted into the top surface of semi-transparent media. The bottom surface may include a relatively opaque or polarization-altering media or a second semi-transparent media. The top surface and the body of semi-transparent media include but are not limited to media such as water or glass. The bottom surface that is relatively opaque or polarization-altering includes but is not limited to media such as ice, sand, rock, wall, skin, hypodermis, cells, other anatomical regions, and/or combinations of the same.

In one embodiment, the lidar system includes a transmitter configured to output polarized light to a target, a receiver configured to collect scattered light from the target, and first and second detectors. The first and second detectors are configured to receive at least a respective portion of the scattered light from the receiver. The first and second detectors may be configured to detect the respective portions of the scattered light and substantially the same time or with some offset. The system also includes timing electronics coupled to each of the first and second detectors.

The transmitter used in the invention may include transmitters that generate and transmit a light with a known polarization. The transmitter may include a laser and a polarizer in optical communication with the laser. The transmitter may further include a half-wave plate in optical communication with the laser. The laser may include at least one of a polarized laser, a pulsed laser, or a continuous wave (CW) laser. In one specific example, a transmitter includes a Teem Photonics 35 mW laser with a 450 ps pulse width with optics that generates and transmits linearly polarized light with degree of polarization greater than 99.9.

The receiver may include one or more receivers that can receive scattered light. The receiver may include a telescope. The receiver may optionally include one or more components for filtering processes (i.e. a spectral filter) and may further include a polarizing splitter. In one specific example, a receiver includes an Orion Maksutov-Cassegrain telescope with a 90 mm aperture and a 1250 mm effective focal length.

The first and second detectors include detectors that can detect and count photons in a light signal. The detectors may include photomultiplier tubes that output a photon count signal. Other detectors that may operate in photon counting or analog mode include avalanche photodiodes, charge coupled devices, or other photon detectors. In one specific example, the detectors include Hamamatsu H7422PA-40 photomultiplier tubes with a 2.5 ns pulse width.

Timing electronics includes electronics that can calculate a relative distance based on an amount of time elapsed between light signals. Timing electronics may include a constant fraction discriminator (CFD) to discriminate an apex in a photon count signal, a time-to-digital converter (TDC), and a processor. In one specific example, timing electronics include a SensL CFD with an 8 ns output pulse width and a SensL HRMTime TDC with a 27 ps bin width and a 190 ns dead time.

In another embodiment, a lidar system includes a light transmitter configured to transmit a light signal, a light receiver configured to receive a scattered light signal, the scattered light signal includes first and second components, and a detector configured to resolve the first and second components of the scattered light signal.

A light signal includes electromagnetic radiation carrying information. Information includes distinguishing attributes of the light signal such as the amplitude, frequency, phase, polarization, other attributes, and/or combinations of the same. The light signal may be coded by natural (i.e., light containing a polarization signature of the target scattered from a linearly polarized incident light) or artificial means (i.e., coding embedded by electronics when a light is generated). In addition, the polarization may be any type of polarization (e.g., linearly, vertical, horizontal, and/or circular). A light signal may be any type of signal (e.g., pulsed or continuous wave (CW) laser, lamp, LED light, and/or other light sources or combinations of the same). Pulsed light signals may have demarcations in the null signal between the pulses; CW light signals may have demarcations where the wave changes modulation, phase, and/or other attributes. A light signal may include component signals with varying attributes occupying at least a portion of substantially the same and/or indistinguishable time and/or space as the light signal.

The scattered light signal includes the specular and diffuse light scattered from the targeted medium. A scattered light signal includes a directed light signal changing direction as a result of the directed light signal hitting a surface. The surface could include polarization preserving or polarization-altering surfaces. The scattered light signal may have a different intensity, frequency, phase, polarization, other attributes, and/or combinations of the same, due to the characteristics of the directed light signal interacting with the surface. Further, when the directed light signal hits a polarization-altering surface, the scattered light signal may scatter significantly to various polarizations and/or directions. A reflected light signal includes the specular light scattered from a target medium. A reflected light signal may further refer to the action of optical components within a transmitter and receiver of an instrument that directs a light signal from one element to another.

A component signal of a light signal includes at least some uniform distinguishing attribute such as amplitude, frequency, phase, polarization, other attributes, and/or combination of the same. In one specific example, the co-planar polarization and the cross-planar polarization of a light signal are two components of a light signal.

In yet another embodiment, a lidar system includes a source of polarized light and a light receiver, the light receiver configured to receive scattered light. The light receiver includes a polarizing beam splitter. The polarizing beam splitter splits the scattered light into a cross-planar polarization component and a co-planar polarization component. The lidar system further includes a first detector and a second detector. The first detector is configured to receive the cross-planar polarized component. The second detector is configured to receive the co-planar polarized component.

In further yet another embodiment, a method of measuring a relative distance between a first surface and a second surface with differing polarization characteristics. The method includes the steps of generating polarized light, scattering at least some of the polarized light from the first surface and at least some of the polarized light from the second surface, receiving the scattered light, and splitting the scattered light into a first and second component. The first and second component have a relative difference in polarization. The method further includes the steps of detecting the first and second component, determining an amount of time elapsed between the first and second component, and calculating a relative distance between the first surface and the second surface based on the amount of time elapsed.

In another embodiment, a lidar system includes a laser light source, an output of the laser light source is laser light. The lidar system further includes a polarizing beam splitter, the laser light is aligned with the transmission axis of the polarizing beam splitter, and an output of the polarizing beam splitter is linearly polarized light. The lidar system further includes a quarter-wave plate, the linearly polarized light transmitted by the polarizing beam splitter is received at the quarter-wave plate. In a first mode of operation, the fast or slow axis of the quarter-wave plate is oriented 45-degrees to the linearly polarized light output of the polarizing beam splitter, circularly polarized light is emitted by the quarter-wave plate. In a second mode of operation, the quarter-wave plate is oriented such that fast and slow axis of the quarter-wave plate are aligned with the linear polarized light output of the polarizing beam splitter, linearly polarized light is emitted by the quarter-wave plate. The lidar system further includes a detector. Light scattered by the polarizing beam splitter is received at the detector.

In yet another embodiment, a lidar system includes a source of light and a variable wave plate. In a first mode of operation, the variable wave plate is configured to output light polarized in a first direction, and in a second mode of operation, the variable wave plate is configured to output light polarized in a second direction relatively different than the first direction. The lidar system further includes a detector. The detector is configured to receive scattered light of the polarized light.

In further yet another embodiment, a method of measuring a relative distance between surfaces includes measuring a relative distance to a polarization preserving surface, which includes generating linearly polarized light at a first time, the generated light is vertically polarized, circularly polarizing the vertically polarized light in a first direction, and scattering at least some of the light circularly polarized in a first direction from the polarization preserving surface. The scattered light is circularly polarized in a second direction after being scattered by the polarization preserving surface. Measuring the relative distance between surfaces further includes linearly polarizing the scattered light, and passing the linearly polarized light to a detector. The light is received at the detector at a second time. Measuring the relative distance between surfaces further includes determining an amount of time elapsed between the first time and the second time to obtain a first time difference, and measuring a relative distance to a polarization-altering surface. Measuring a relative distance to the polarization-altering surface includes generating linearly polarized light at a third time, the generated light is vertically polarized, passing at least a first portion of the vertically polarized light through the polarization preserving surface to the polarization-altering surface, a second portion of the vertically polarized light is scattered by the polarization preserving surface as vertically polarized light, scattering the linearly polarized light passed through the polarization preserving surface from the polarization-altering surface, the linearly polarized light is altered after being scattered by the polarization-altering surface, passing a horizontally polarized component of the polarization-altered scattered light to a detector, the light is received at the detector at a fourth time, light scattered by the polarization preserving surface is not passed to the detector, determining an amount of time elapsed between the third time and the fourth time to obtain a second time difference, using the first and second time differences, and calculating a relative distance between the polarization preserving surface and the polarization-altering surface.

In another embodiment, a method of measuring relative distance between a first surface and a second surface with different polarization characteristics includes generating light, scattering the light respectively from the first surface and the second surface, receiving each of the scattered light from the first surface and the second surface, detecting the scattered light, and determining an amount of time elapsed between the light scattered from the first surface and the light scattered from the second surface.

Reference will now be made in detail to an embodiment of the present invention, examples of which are illustrated in the accompanying drawings.

FIG. 1 illustrates a lidar system 104 in accordance with embodiments of the present invention, in an exemplary operating environment 100). The lidar system 104 generates transmitted light 108 that is directed towards a target 112. The target 112 may comprise a body of water 116 having a top surface 120 and a floor 124. In a first mode of operation, light 128 scattered from the surface 120 of the target 112 is received by the lidar system 104. The time elapsed between the generation of a pulse of light 108 scattered from the surface 120 of the target 112 and returned to the lidar system 104 as a scattered signal 128 is used to determine a relative distance between the surface 120 of the target 112 and the lidar system 104. In a second mode of operation, the time elapsed between the generation of a pulse of transmitted light 108 and a signal 132 scattered from the floor 124 of the target 112 is used to determine the relative distance between the lidar system 104 and the floor 124 of the target 112. By taking the difference between the distance to the surface 120 and the distance to the floor 124, the relative distance between the surface 120 and the floor 124 can be determined. Accordingly, the relative depth of the water 116 can be determined. In the example of FIG. 1, the lidar system 104 is associated with a platform 136 comprising an airplane. However, a lidar system 104 in accordance with embodiments of the present invention may be associated with different platforms 136. Examples of suitable platforms 136, in addition to an airplane, include satellites, unmanned aerial vehicles, helicopters, balloons, boats, or other platforms. In addition, a lidar system 104 in accordance with embodiments of the present invention is not limited to shallow water bathymetry. For example, the lidar system 104 can be used for bottom surface mapping, or for determining the distance between any polarization preserving surface that is at least partially transmissive of light 108, and a polarization-altering surface behind the polarization preserving surface, particularly in the instance where the separation distance would be otherwise unresolvable due to system bandwidth limitations associated with laser and/or detector pulse widths. The polarization-altering surface includes but is not limited to media such as ice, sand, rock, wall, skin, hypodermis, cell, other anatomical regions, and combinations of the same.

Figure 2A:
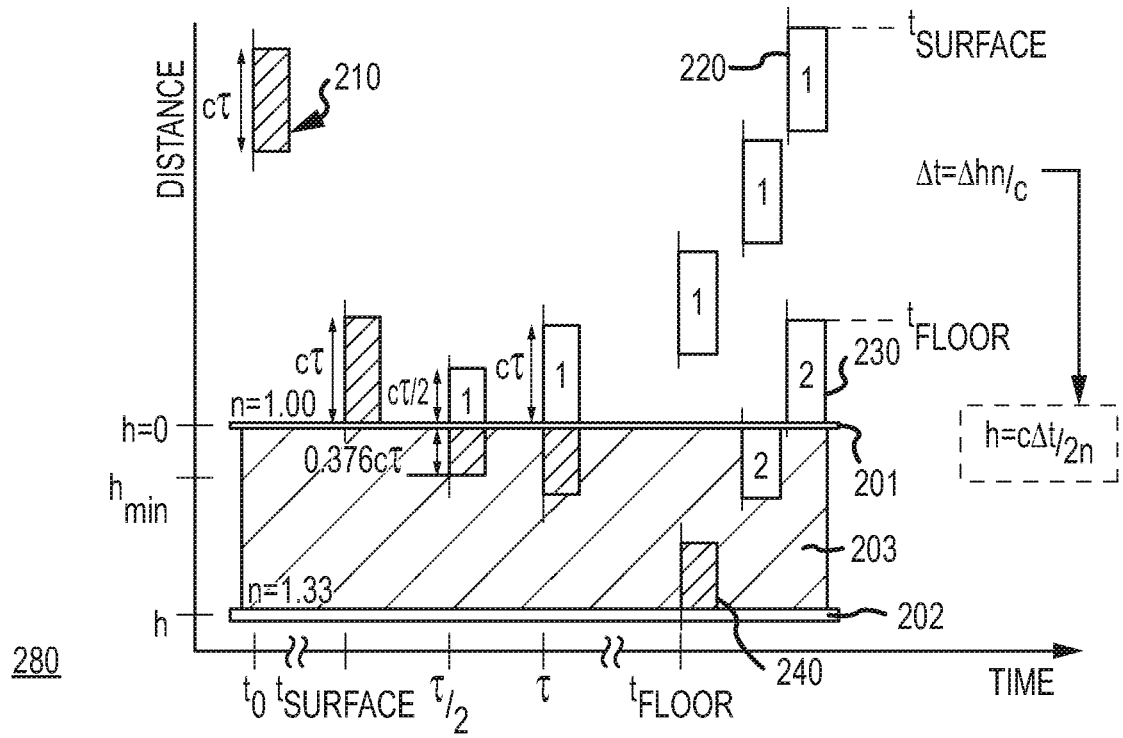
FIG. 2A and FIG. 2B illustrate detection of scattered light pulse over time for a system with pulse width resolution.
Figure 2B:
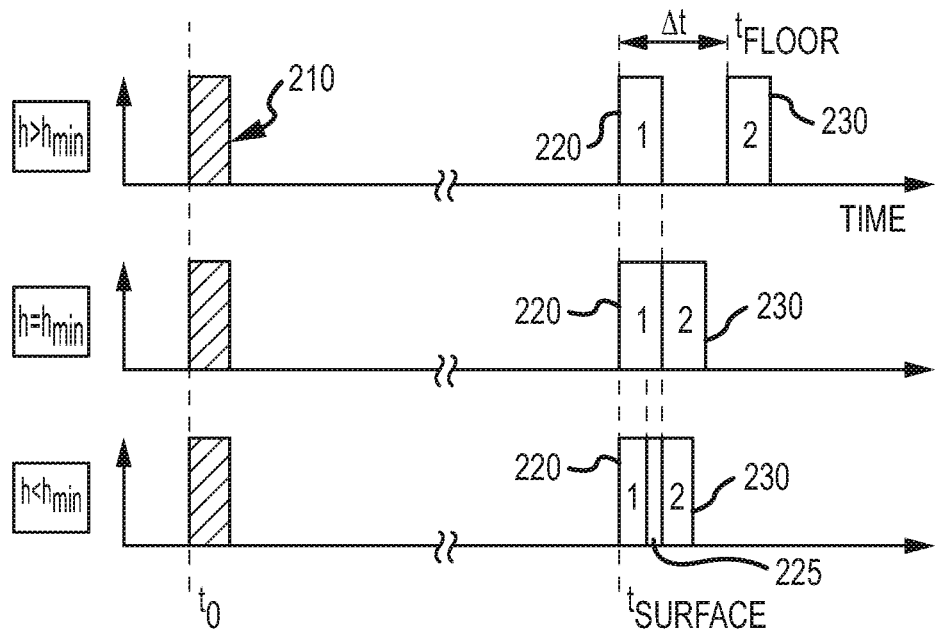

FIG. 2A and FIG. 2B illustrate detection of scattered light pulse over time for a system with pulse width resolution.

FIG. 2A depicts an exemplary shallow water environment 280 with shallow water body 203 having water surface 201 and water floor 202. The y-axis represents the distance of a vertical cross-section of shallow water environment 280. The x-axis represents time. The level of water surface 201 is at distance h=0; the level of water floor 202 is at distance h. Water body 203 with a water medium has a refractive index of n=1.33. Air medium above water surface 201 has a refractive index of n=1.

Transmitted (Tx) pulse 210 is a light pulse having a length $c\tau$. At time $t_0$, Tx pulse 210 is generated by a lidar system such as lidar system 104 or by other light sources. In environment 280, Tx pulse 210 is being transmitted substantially normal to water surface 201. However, Tx pulse 210 may be transmitted at other angles as long as Tx pulse 210 can be at least partially scattered from and partially refracted through water surface 201.

At time $t_{surface}$ Tx pulse 210 arrives at water surface 201. As stated, Tx pulse 210 will be partially scattered off water surface 201, the scattered light pulse being received (Rx) pulse 220, and partially refracted through water surface 201 into water body 203, the refracted light pulse being refracted pulse 240. Thus, at time $\tau/2$, half of Tx pulse 210 has been scattered as Rx pulse 220 with length $c\tau/2$, and half of Tx pulse 210 has been refracted as refracted pulse 240 with length $0.376c\tau$ (due to the refraction index in water body 203). At time $\tau$, Tx pulse 210 has been fully either scattered as Rx pulse 220 or refracted as refracted pulse 240.

At time $t_{floor}$ refracted pulse 240 reaches water floor 202 and will be at least partially scattered as Rx pulse 230. Rx pulse 230, like refracted pulse 240, will have a comparatively shortened length when traveling in water body 203 because of the refractive index of water body 203 (n=1.33) as opposed to air (n=1). Rx pulse 230 will lengthen to length $c\tau$ when it exits the water surface 201.

Thus, when Rx pulse 230 exits water surface 201, the time difference between $t_{floor}$ and $t_{surface}$ can be derived from the time difference between Rx pulse 220 and Rx pulse 230. Further, the relationship between the time difference of $t_{floor}$ and $t_{surface}$ and the physical distance between water surface 201 (h=0) and water floor 202 (h) is given by Therefore, the depth of water body 203 can be determined.

$$h = \frac{c\Delta t}{2n} \tag{1}$$

FIG. 2B depicts timings diagrams for Rx pulses 220 and 230 for specific water depth scenarios. When the distance between water surface 201 and water floor 202 (h) is greater than a minimum depth of water ($h_{min}$) for which half of Rx pulse 220 has scattered from water surface 201 (h>$h_{min}$), a discernible gap exists between Rx pulses 220 and 230, and timing difference between Rx pulses 220 and 230 ($\Delta t$) is $t_{floor}-t_{surface}$. When the distance between water surface 201 and water floor 202 (h) is equal to $h_{min}$, Rx pulse 230 comes directly after Rx 220 with no discernible gap and no overlapped portions between Rx pulses 220 and 230. When the distance between water surface 201 and water floor 202 (h) is less than $h_{min}$, (h<$h_{min}$), Rx pulse 230 comes before the entire portion of Rx pulse 220 has progressed, creating an ambiguous interpulse overlap 225.

Therefore, there is a limitation to the detection method as described in FIG. 2A and FIG. 2B. This limitation is that the scattered pulses Rx pulse 220 and Rx pulse 230 must be substantially separable. That is, Rx pulse 230 must not start to exit water surface 201 before Rx pulse 220 has been completely scattered from water floor 202. Effectively, this requirement requires a minimum depth of water ($h_{min}$) for which Rx pulse 230 cannot scatter from water floor 202 before half of Rx pulse 220 has scattered from water surface 201 at time $\tau/2$. In this embodiment, $h_{min}$ is $0.376c\tau$ (due to the refraction index in water body 203 as discussed previously) and depends on the length of Tx pulse 210.

When h<$h_{min}$, the two scattered pulses, Rx pulse 220 and 230, have an ambiguous interpulse overlap 225 that is not separable for resolving the time difference between $t_{floor}$ and $t_{surface}$ from Rx pulses 220 and 230. In practice, $h_{min}$ is limited by equipment limitations for generating and detecting light pulses with minimal length r.

Figure 2C:
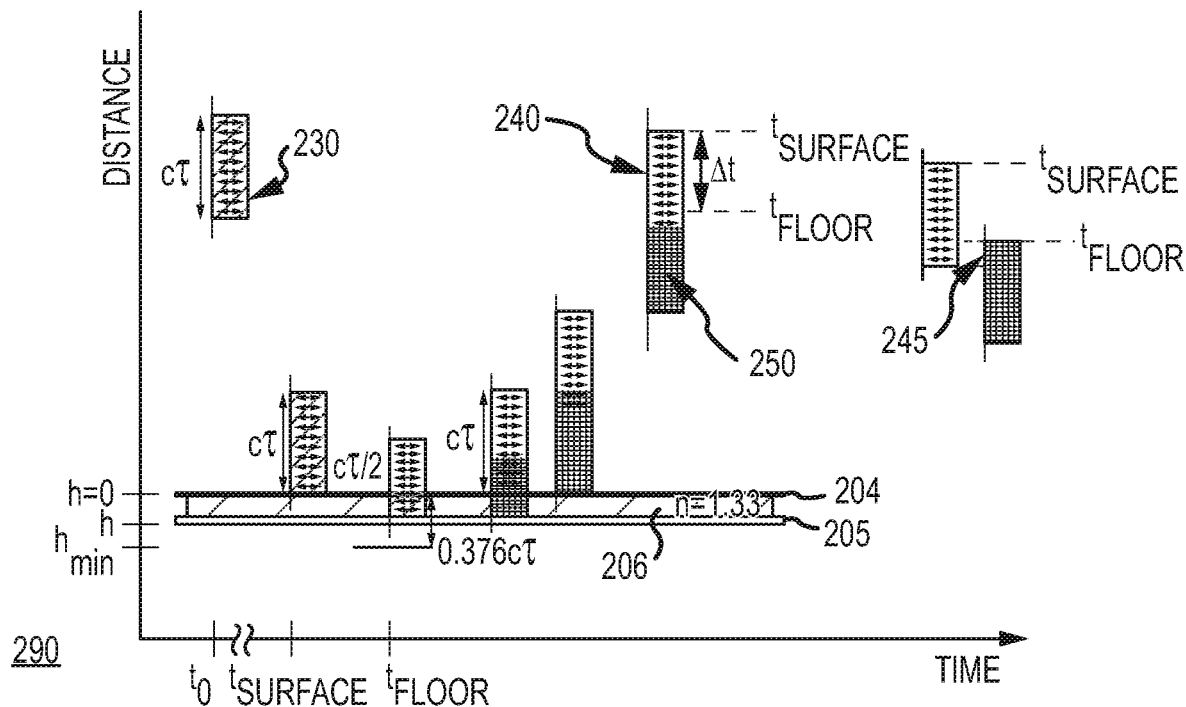
FIG. 2C and FIG. 2D illustrate detection of scattered light pulse over time for a system with sub-pulse width resolution in accordance with an embodiment of the present invention.
Figure 2D:
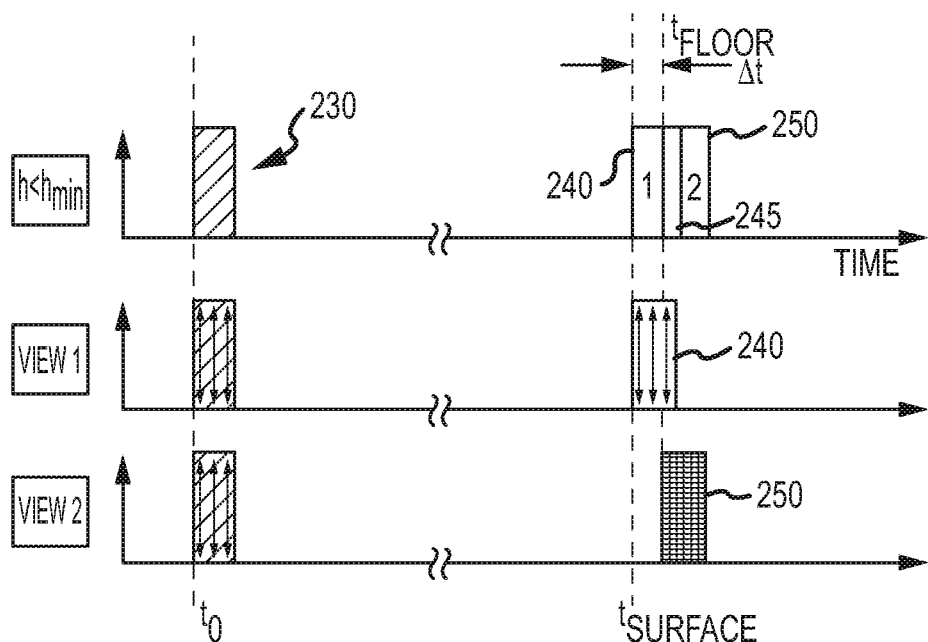

FIG. 2C and FIG. 2D illustrate detection of scattered light pulse over time for a system with intrapulse or sub-pulse width resolution in accordance with an embodiment of the present invention.

Referring to FIG. 2C, an exemplary shallow water environment is depicted as reference number 290. The environment 290 includes a shallow water body 206 having water surface 204 and water floor 205. The y-axis represents the distance of a vertical cross-section of shallow water environment 290. The x-axis represents time. The level of water surface 204 is at distance h=0, and the level of water floor is at distance h. The depth of water body 206 is at distance h, which is less than the minimum depth of water ($h_{min}$) for Tx pulse 230. Therefore, an Rx pulse 240 that is scattered from water surface 204 and an Rx pulse 250 that is scattered from water floor 205 includes an ambiguous interpulse overlap portion 245. Ambiguous interpulse overlap 245 is created similarly to ambiguous interpulse overlap 225 as described with respect to FIG. 2A and FIG. 2B.

In this embodiment, Tx pulse 230 is a light pulse having a known polarization. For example, Tx pulse 230 is polarized in the cross-planar direction to the propagation vector of Tx pulse 230, which is normal to water surface 204 when in direct nadir viewing. Tx pulse 230 can be polarized by a lidar system, such as lidar system 104, or by other polarizing light sources as known in the art. As Tx pulse 230 arrives at water surface 204 at time $t_{surface}$. Tx pulse 230 is partially scattered by water surface 204 as Rx pulse 240. Since water surface 204 is a polarization preserving surface, Rx pulse 240 keeps substantially the same polarization as Tx pulse 230. Tx pulse 230 is also partially refracted into water body 206. The refracted portion of Tx pulse 230 is scattered by water floor 205 at time $t_{floor}$. Water floor 205 is a polarization-altering surface and creates polarization scattering in the scattered light. Therefore, Rx pulse 250 will have a different polarization from Tx pulse 230 and Rx pulse 240 when scattered from water floor 205.

FIG. 2D depicts timings diagrams for Rx pulses 240 and 250 for water depth of $h<h_{min}$. Scattered pulses Rx pulse 240 and Rx pulse 250 will have an overlap 245 because of $h<h_{min}$. Referring to views 1 and 2, in this embodiment, the ambiguous interpulse overlap 245 can be removed and Rx pulses 240 and 250 can be separated as two distinct signals because Rx pulse 240 has only the cross-planar polarization being scattered from water surface 204, and Rx pulse 250 has a range of altered polarizations due to the backscattering from being scattered from water floor 205. This separation may be achieved by various mechanical (i.e., mechanically movable mirrors), optical (i.e., prisms or splitting polarizers), electronic means (i.e., photon counting detectors), and/or combination of the same.

While FIGS. 2A-2D were discussed with respect to one transmitted polarized light pulse according to an embodiment of the invention, other configurations can be used. For example, instead of pulsed light, continuous wave (CW) laser can also be used (I.e., where gaps between each "pulse" can be similarly obtained by modification of phase induced by scattering). Further, two or more transmitted light pulses with different polarizations can also be used in place of or in complement to the one cross-planar polarized light. For example, according to one embodiment of the invention as discussed with reference to FIG. 5, two light pulses can be transmitted each having a different polarization such that, after filtering, one pulse will gather signal only from the polarization preserving surface and one pulse will gather signal only from the polarization-altering surface. In this configuration, only one detector is required to count both light pulses. Still further, polarizations that are in alignment with the transmitted pulse (i.e., co-planar and cross-planar polarization) are preferred but are not required. Other polarization angles can be used and may be better suited for other applications (i.e., surfaces positioned at an angle or surfaces made up of other materials such as ice).

Figure 3:
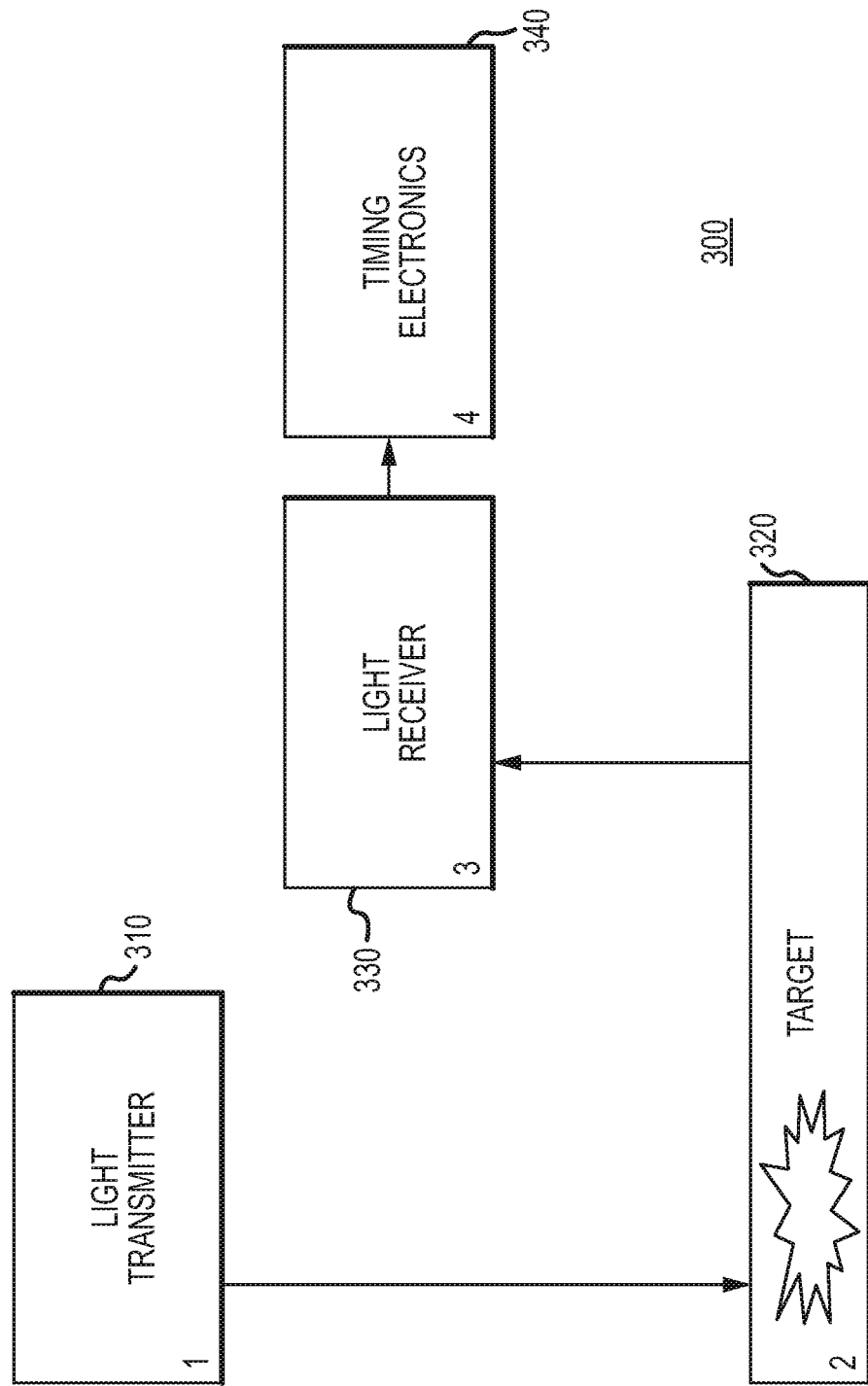
FIG. 3 illustrates a lidar system in accordance with an embodiment of the present invention.

FIG. 3 illustrates a lidar system according to an embodiment of the invention.

Referring to FIG. 3, lidar system is generally depicted as reference number 300). The lidar system 300 includes a light transmitter 310, light receiver 330, and timing electronics 340. The light transmitter 310 is configured to generate and output at least one light signal (e.g., pulsed or continuous wave (CW) laser). In a preferred embodiment, the outputted light signal has a known polarization. Target 320 is a shallow water body or any other type of body with a respective relatively polarization preserving and semi-transparent surface (first surface) and a relatively polarization-altering (e.g., opaque and/or depolarization) surface (second surface). The outputted light signal from light transmitter 310 is configured to scatter from both the first and second surfaces. Light receiver 330 is configured to receive the scattered light signals from target 320 and separate the scattered light signals into their respective components. Timing electronics 340 is electrically coupled to light receiver 330 and is configured to calculate a relative distance based on an amount of time elapsed between light signals.

Figure 4:
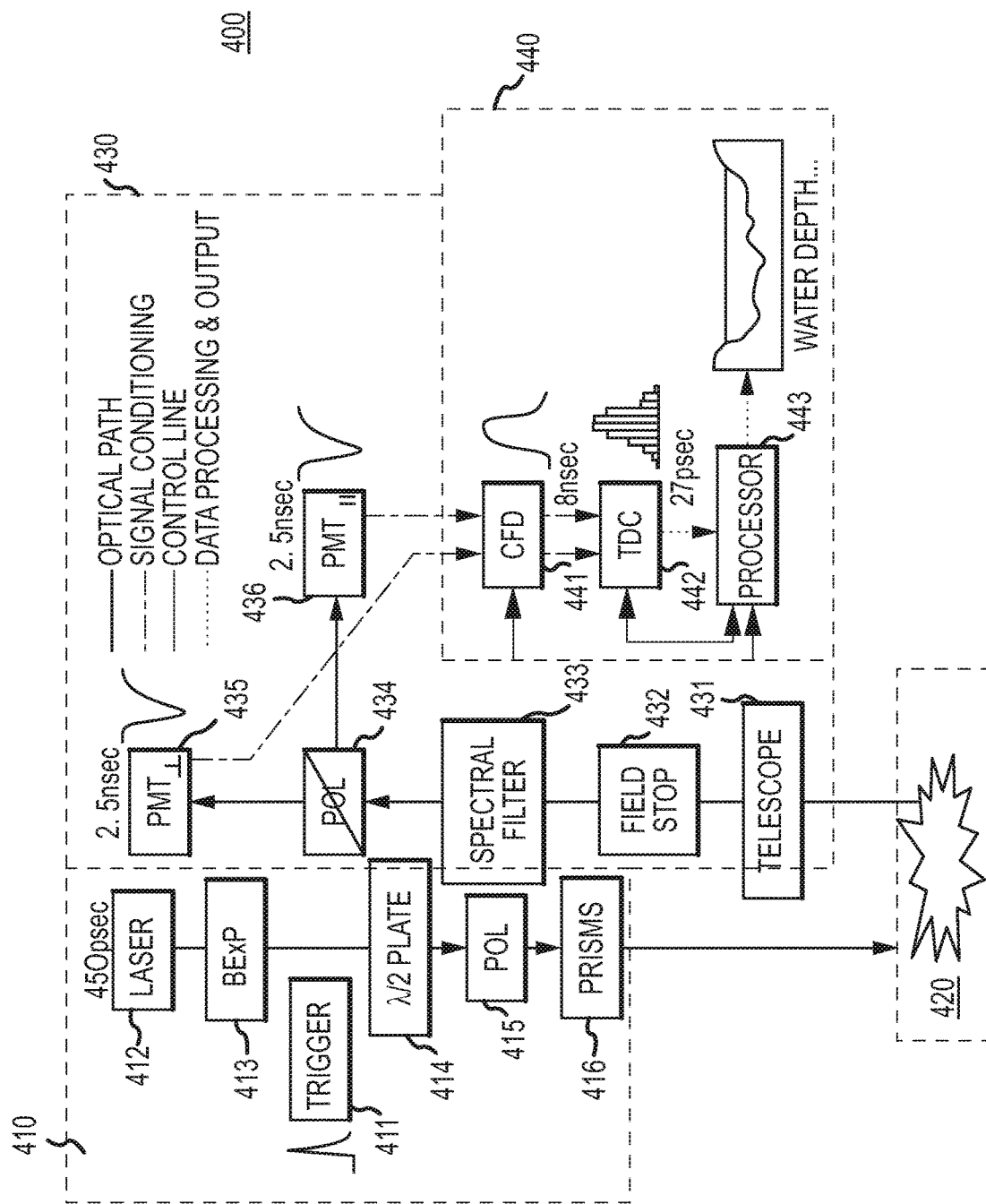
FIG. 4 depicts components of a lidar system in accordance with an embodiment of the present invention.

FIG. 4 illustrates components of a lidar system according to an embodiment of the invention.

Referring to FIG. 4, the lidar system 400 includes light transmitter 410, light receiver 430, and timing electronics 440. In this embodiment, the light transmitter 410 includes laser 412, beam expander 413, half-wave plate 414, polarizer 415, and prisms 416. Laser 412 acts as a light source for lidar system 400 and is configured to emit a focused light as the basis of the transmitted light signal. Laser 412 can be a pulsed laser, continuous wave (CW) laser, polarized laser, or other types of lasers. In other embodiments, laser 412 can generically include other light sources as known in the art (i.e., lamp or LED light). In one embodiment, a 450 ps pulsed laser is used as laser 412. Beam expander 413, half-wave plate 414, polarizer 415, and prisms 416 are optional and are configured to focus and align the transmitted light signal towards target 420. In this embodiment, the chain of beam expander 413, half-wave plate 414, polarizer 415, and prisms 416 are each aggregated and aligned to the optical path of the transmitted light signal. Beam expander 413 is configured to expand the transmitted light signal for tight spot targets. Half-wave plate 414 may be mechanically or electrically (i.e., using a liquid crystal variable retarder) operable to control the retardance of the focused light signal along the optical path. Polarizer 415 is configured to polarize the light signal with a known polarization. A polarizing laser may also be used as laser 412 for a known polarization. Prisms 416 are configured to coaxially direct and focus the transmitted light signal to target 420 as known in the art.

In operation, trigger 411 may be electrically coupled to laser 412 or other components of light transmitter 410 to start the transmission of the light signal. In other embodiments, light transmitter 410 may operate continuously without trigger 411. Light signal is transmitted from light transmitter 410 to target 420. Target 420 includes at least a first surface and a second surface as described herein. The transmitted light signal is partially scattered from the first surface as a first scattered light signal and partially refracted into the target. The refracted light is scattered from the second surface as a second scattered light.

The first scattered light signal has substantially the same polarization as the transmitted light signal while the second scattered light signal will have a different polarization due to the scattering from the second surface. The first and second scattered light signals may have an overlapped interpulse portion forming one combined scattered light signal.

Light receiver 430 includes telescope 431, field stop 432, spectral filter 433, splitting polarizer 434, first detector 435, and second detector 436. Each of these components are aggregated and aligned to an optical path of the scattered light signal. Telescope 431 acts to collect the scattered light signal. Field stop 432 and spectral filter 433 are optional components. Field stop 432 acts to limit the field of view of light receiver 430 where the scattered light signal would be gathered. Spectral filter 433 acts to further filter the received light to the light spectrum of interest (i.e., limiting the spectrum to the expected frequency of the scattered light signals).

Splitting polarizer 434 acts to separate the received scattered light signal according to the polarization. In this embodiment, the polarization splitter 434 is aligned with the optical path of the scattered light signal. As scattered light signal reaches polarization splitter 434, the cross-planar polarized component of the signal substantially passes through polarization splitter 434 while the co-planar polarized component of the signal substantially reflects. The angle of reflection is a function of the type of polarizer used (i.e. 90° angle or 62° angle for a Glan Taylor polarizer). Here, the first scattered light signal scattered from the water surface containing cross-planar polarized light is substantially reflected (i.e., at a 90° angle) while at least the co-planar polarization component of the second scattered light signal scattered from the water floor containing depolarized light is substantially transmitted. Other orientations are also possible depending on the polarization methodology used on the transmitted light signal and the type of polarizer used for polarization splitter 434.

Detector 435 is positioned at a 180° optical path from the reflected light signal and configured to detect the cross-planar polarization component of scattered light signal. Detector 436 is positioned at the optical path of the reflected light signal (i.e., 900) and is configured to detect the co-planar component of the scattered light signal. As such detector 436 is configured to detect the first scattered signal from the water surface while detector 435 is configured to detect the second scattered signal from the water floor. Detectors 435 and 436 may be photomultiplier tubes and are configured to count the volume of photons in each signal within a certain time interval representing the strength of the signal and output a photon count signal. In one embodiment, detectors 435 and 436 have 2.5 ns resolution. Moreover, the detectors 435 and 436 can be configured to substantially simultaneously detect separated scattered signals from the polarizing beam splitter 434.

It is noted that polarizing beam splitter 434 can be positioned at a variety of angles to split the scattered light signal at other angles. Detectors 435 and 436 can be positioned at other configurations to receive such split components of the scattered light signal.

The timing electronics 440 may include a constant fraction discriminator (CFD) 441, time-to-digital converter (TDC) 442, and processor 443. Processor 443 is coupled to CFD 441 and TDC 442 through a control line for control and feedback of these components. CFD 441 is coupled to detectors 435 and 436 through a signal conditioning line and is configured to output an apex of the photon count signal at certain intervals representing the time at which the signal has meaningfully arrived. In one embodiment of the invention, CFD 441 has an 8 ns resolution. TDC 443 is coupled to CFD 441 and is configured to convert the time signal output by CFD 441 into a digital signal. In one embodiment of the invention, TDC 442 has a resolution of 27 ps.

Processor 443 is coupled to TDC 442 and is configured to take the digitized timing signal and determine the time of arrival of each component (co-planar and cross-planar polarized signals in one embodiment) and calculate the difference in the time of arrival of the two signals. In this embodiment, the processor 443 is further configured to transform the time difference into the depth between the polarization preserving and polarization-altering surfaces depending on the calibration of the lidar system 400 and the refraction index of shallow water body or other types of bodies in question. Further description of this calculation will be described with respect to FIG. 5.

Further, an initial calibration to lidar system 400 may be needed because the light paths to detectors 435 and 436 may not be the same after the scattered light is separated by polarizing splitting 434. According to one embodiment, this calibration can be accomplished by using a scattered signal from a surface that is depolarizing and noting a difference in the assessment of distance to that surface between the detectors 435 and 436. The difference in the assessment of distance is likely due to the slightly different optical paths between each of detectors 435 and 436 and polarizing splitter 434. In one embodiment, this calibration can be performed once and saved for adjustment by processor 443. The correction and adjustment can be applied to subsequent depth data by processor 443.

Figure 5:
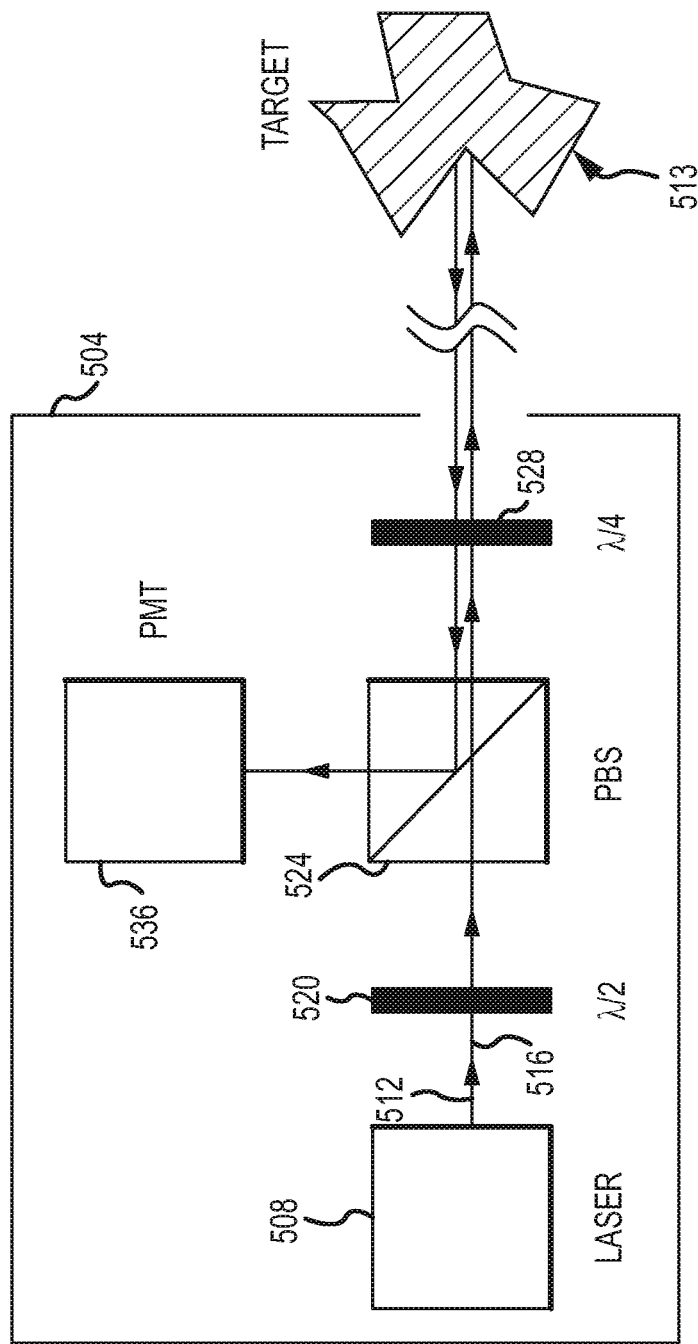
FIG. 5 depicts components of a lidar system in accordance with an embodiment of the present invention.

FIG. 5 illustrates components of a lidar system in accordance with embodiments of the present invention.

Referring to FIG. 5, the lidar system 504 includes an optical bench or other structure, to which other components may be directly or indirectly connected. These components include a light source (e.g., pulsed or CW laser) or laser 508. The laser 508 may be operated to generate linearly polarized light 512 that is transmitted along an optical axis 516. As an example, the linearly polarized light 512 may have a wavelength of 532 nm. A half-wave plate 520 can be included along the optical axis 516. The half-wave plate 520 may be rotated about the optical axis 516, at least during a calibration stage, to control the orientation of the linearly polarized light 512 about the optical axis 516.

A polarizing beam splitter (PBS) 524, such as a polarizing beam splitter cube, is located along the optical axis 516. Where required to maximize transmission, the linearly polarized light 512 can be rotated about the optical axis 516 by the half-wave plate 520, such that the light 512 is aligned with the transmission axis of the PBS 524, enabling the maximum amount of linearly polarized light 512 to pass through the PBS 524.

A quarter-wave plate 528 is located along the optical axis 516 such that the linearly polarized light 512 transmitted by the PBS 524 is passed through the quarter-wave plate 528. In addition, the quarter-wave plate 528 is free to rotate about the optical axis 516. As will be described in greater detail elsewhere herein, the quarter-wave plate 528 may be rotated between a first orientation, in which the quarter-wave plate 528 acts to circularly polarize the light 512 received from the polarizing beam splitter, and a second orientation, in which the quarter-wave plate 528 is aligned so as to maintain the linear polarization state of the light 512 received from the polarizing beam splitter 524. As an alternative, an electronically controlled variable wave plate may be used in place of the quarter-wave plate 528.

A detector 536 is located to receive light scattered from a target 513 back through the quarter-wave plate 528, and that is in turn reflected by the PBS 524. The detector 536 may, for example, comprise a photomultiplier tube, an avalanche photodiode, a charge coupled device, or other light detector.

In a first mode of operation, the fast axis of the quarter-wave plate 528 is oriented 45° to the linear polarization output of the PBS 524. In this orientation, the quarter-wave plate 528 retards the linear slow polarization component of the light 512 transmitted from the laser 508 through the PBS 524 relative to the fast polarization component of that light 512 by 90°, resulting in the emission of light towards the target 513 that is circularly polarized in a first direction. The surface of a target 513 comprising a body of water is polarization preserving. Accordingly, the circularly polarized light is scattered back to the lidar 504 in the opposite circular polarization state. For example, where the light 508 transmitted to the target 513 is left hand circularly polarized, the light scattered from the surface of the target 513 will be right hand circularly polarized. The light scattered back to the lidar system 504 is retarded again by the quarter-wave plate 528. The result is linearly polarized light that is rotated about the optical axis 516 by 90° as compared to the light 512 that originally exited the PBS 524. For example, where the light 512 exiting the PBS 524 was vertically polarized, the light scattered by the polarization preserving surface will be horizontally polarized after again passing through the quarter-wave plate 528. Accordingly, the scattered light is aligned with the reflection axis of the PBS 524, and is directed by the PBS 524 to the detector 536. Accordingly, a light pulse comprising scattering from the surface of the target 513 is delivered to the detector 536.

In the second mode of operation, the quarter-wave plate 528 is rotated such that the fast and slow axes are aligned with the transmission plane of the PBS 524. The vertical polarization components of the transmitted light are thus retarded equally by the quarter-wave plate 528. As a result, linearly (e.g., vertically) polarized light is transmitted to the target 513. Because the surface and the water column of a target 513 comprising a body of water are polarization preserving, the linear polarization state of the incident light is preserved. When scattered back to the lidar system 504, this linearly polarized light is passed through the quarter-wave plate 528 unmodified, as linearly (e.g., vertically) polarized light that is then transmitted by the PBS 524 back toward the laser 508. Accordingly, the light scattered by the surface or the water column of the target 513 is not delivered to the detector 536. However, the floor of the target 513 alters the polarization of the transmitted linearly polarized light upon scattering. This polarization-altering effect is due to attributes such as the rough topography of a typical floor of a body of water. The polarization-altered light scattered back to the lidar system 504 by the floor of the target 513 is not altered by the quarter-wave plate 528. Accordingly, half of the light scattered from the floor of the target 513 is reflected by the PBS 524 to the detector 536 for detection. The other half of the light is transmitted through the PBS 524 back toward the laser 508. As a result, in this second mode of operation, the lidar system 504 only passes light scattered from the floor of the target 513 to the detector 536. This facilitates the detection of the floor, even in connection with targets 513 comprising shallow (e.g., less than 10 cm) bodies of water, since the earlier return from the surface and column of the body of water is passed through the PBS 524 back toward the laser 508, and therefore is not directed to the detector 536.

The scattering surface that is measured in shallow water bathymetry using a lidar system 504 in accordance with embodiments of the present invention is dictated by the orientation of the rotating quarter-wave plate 528 and subsequent modulation of transmitted and received polarization states. An analytical description of the technique begins by defining the associated Stokes vector of the transmitted linearly polarized laser pulse 512, $S_{Tx}$, not limited to but for the purposes of demonstration here is oriented to an angle $\theta$ of $\pi/4$ radians about the optical axis out of the laser transmission face.

$$S_{Tx} = \begin{bmatrix} 1 \\ 0 \\ 1 \\ 0 \end{bmatrix} \quad (2)$$

The half-wave plate 520 used to rotate the linearly polarized laser 508 light 512 into alignment with the transmission axis of the PBS 524 is expressed as a variable wave plate with phase shift $\gamma$ of $\pi$ radians, oriented to rotate the linearly polarized laser 508 light 512 to the transmission axis of the PBS 524. For the manifestation of the technique described here, the half-wave plate 520 is oriented to an angle $\theta$ of $\pi/8$ radians about the optical axis. The resulting Mueller matrix for the variable wave plate is defined as $$VWP = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 1 & 0 & 0 & 0 \\ 0 & 1 & 0 & 0 \\ 0 & 0 & \cos(\gamma) & \sin(\gamma) \\ 0 & 0 & -\sin(\gamma) & \cos(\gamma) \end{bmatrix} \quad (3)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

The PBS 524 is modeled as a polarizer oriented to an angle $\theta$ of 0 radians for transmission along the vertical axis in the instrument transmitter, and oriented to 0 of $\pi/2$ radians for horizontal transmission in the receiver.

$$Pol = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 0.5 & 0.5 & 0 & 0 \\ 0.5 & 0.5 & 0 & 0 \\ 0 & 0 & 0 & 0 \\ 0 & 0 & 0 & 0 \end{bmatrix} \quad (4)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

During acquisition of bathymetric measurements, the quarter-wave plate 528 is initially oriented to $\theta$ of $\pi/4$ radians for transmission of circularly polarized light towards the target 513 and then rotated to $\theta$ of 0 radians for transmission of linear polarization. The quarter-wave plate 528 is expressed in terms of the variable wave plate Mueller matrix of (3), with phase shift $\gamma$ of $\pi/2$ radians. As experienced along the return path of scattered signals, the quarter-wave plate 528 is expressed with orientation $\theta$ of $-\pi/4$ radians for reception of circularly polarized light and $\theta$ of 0 radians for reception of polarization-altered signals.

An example, normalized Mueller matrix that describes the scatter produced by the target 513 water body incorporates a d term which ranges from 0 to 1 and describes the target's ability to alter the polarization state (depolarize) of the incident laser pulse polarization. In this sense, a d value of 0 corresponds to a polarization preserving target such as the water surface, while a d value of 1 defines a completely depolarizing target such as a rough floor topography.

$$MDep_d = \begin{bmatrix} 1 & 0 & 0 & 0 \\ 0 & 1-d & 0 & 0 \\ 0 & 0 & d-1 & 0 \\ 0 & 0 & 0 & 2d-1 \end{bmatrix} \quad (5)$$

Combining the transmitted Stokes vector in (2) with the appropriate Mueller matrices described in (3)-(5) produces the received Stokes vector $$S_{Bx} = [VWP_{Tx}^{\lambda/2} \cdot Pol_{Tx} \cdot VWP_{Tx}^{\lambda/4} \cdot Mdep_d \cdot VWP_{Bx}^{\lambda/4} \cdot Pol_{Bx}] S_{Tx} \quad (6)$$

the intensity of which, as measured by the detector 536, is defined as $$I_{Bx} = [1000] S_{Bx} \quad (7)$$

Figure 8:
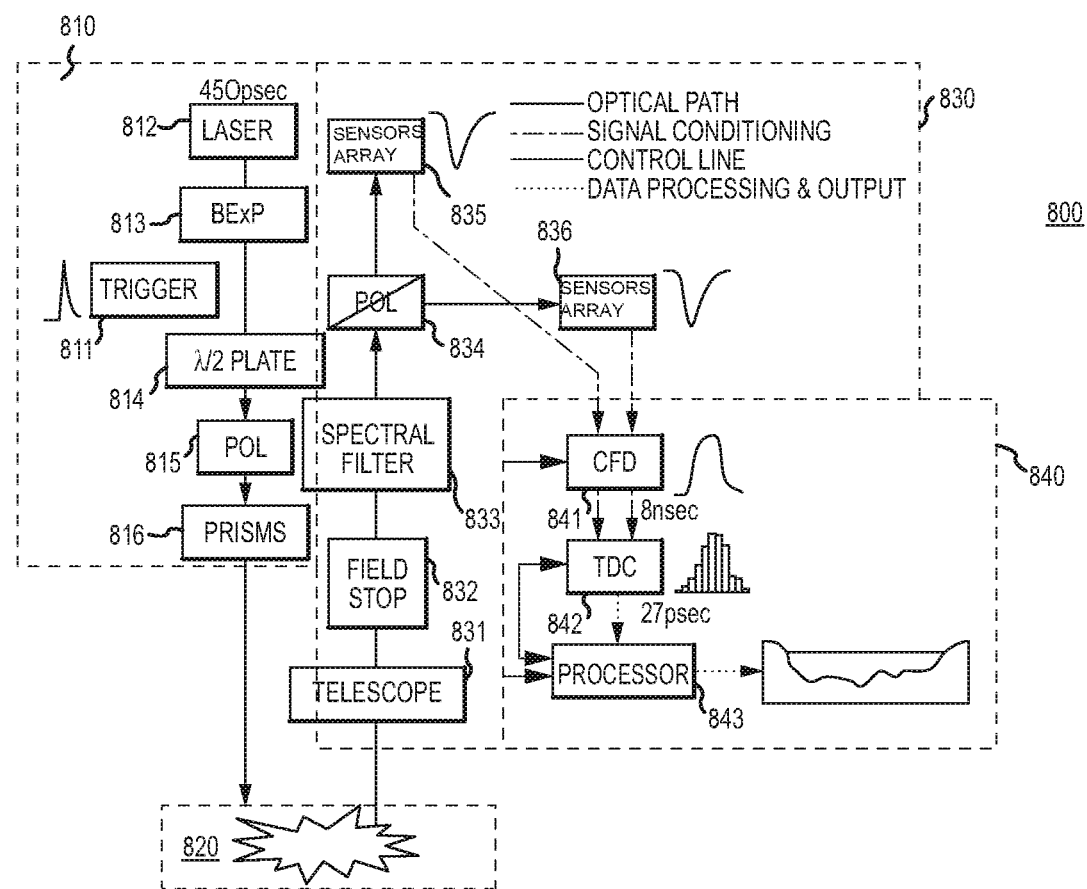
FIG. 8 illustrates components of a lidar system according to an embodiment of the invention.
Figure 9:
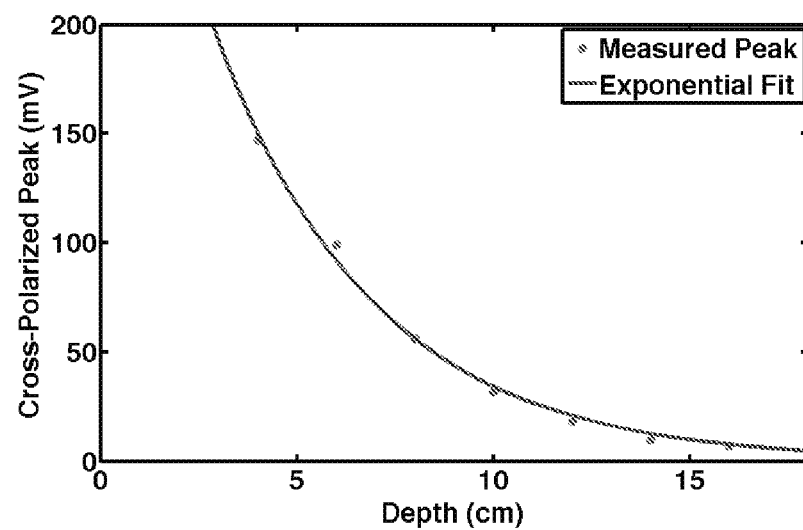
FIG. 9 illustrates the measurement of water quality in terms of turbidity of semi-transparent media with sub-pulse width resolution.

FIG. 8 illustrates components of a lidar system according to an embodiment of the invention.

In an embodiment, the sub-pulse width resolution technique using a lidar system according to an embodiment is not limited to detection of hard surfaces but is also capable of detecting and characterizing "soft targets" whose optical density becomes sufficiently large to produce multiple scattering effects in the media. For example, water quality is often described by the level of turbidity. Turbidity is caused by the distribution of suspended particles in the water that reach sufficient optical density to scatter photons multiple times along the light path, consequently attenuating the light and obscuring the light path. These "soft targets" constitute a scattering target for a lidar system.

Lidar systems may work under a single-scattering assumption, that is, transmitted light scatters only once back to a co-aligned receiver. In many situations, this is an appropriate assumption to make but in optically dense media, such as turbid water or clouds, it is impossible to ignore the contribution of multiple scattering. Three of the important considerations that multiple scattering introduces is an increase in the angular spread of returned photons (light will scatter away from its initial direction axis and back to the detector), stretching the return in time (light travels an extended path within the media before returning to the receiver), and increase the amount of depolarization in the returned light (light transmitted with one polarization will return with a different polarization).

In particular, the single-scattering elastic backscatter lidar equation can be written in a form:

$$P(z) = \frac{K(z)}{z^2} \beta(z) e^{-2\gamma(z)}$$

where P (z) is the received power from range z, K(z) is the instrument and overlap function, β(z) is the backscattering coefficient, $\gamma(z) = \int_0^z a(z)dz$ is the optical depth at range z, and a(z) is the extinction coefficient. Lidar systems exploit this equation and attempt to extract β(z) and a(z) which often involves some assumption about the relation between the two. In order for this equation to remain valid, photons which are not exactly backscattered are assumed to last forever. Once the field-of-view (FOV) is large enough that multiply scattered photons may remain in the field-of-view and their contribution can be captured, then this equation must be modified in some way.

In simulations (e.g., Monte Carlo simulations), we have investigated a) how the angular spread of returned photons depends on recorded range, b) what new information this can provide about the particles doing the multiple scattering, and c) whether this can be incorporated into a lidar transmitter/receiver using current technologies.

There are two main results that have come out of these simulations for application to wide field-of-view lidar systems. The first is that we can calculate the optical depth of a cloud or of turbid media by measuring the depolarization of the returned lidar pulse, as long as the field-of-view of the receiver is large enough to observe multiple scattering. As the laser pulse penetrates the cloud it is depolarized by multiple scattering. The number of scattering events is related to the total optical depth (or the optical depth at a given range) so we can then relate the amount of depolarization to the optical depth of the medium. The second result is that the observed angular spread of the returned multiply-scattered light is related to the size of the panicles. In Mie theory, as the particle size increases, the angular width of the forward scattering peak decreases, and therefore we see that the angular spread of the returned light is also smaller. By taking measurements with different field-of-view we can then work out how the lidar pulse is spreading laterally through the medium, which then informs on the particle size. These two measurements, taken simultaneously, can serve to identify two important cloud parameters.

Most lidar systems operate in a single-scattering regime but in an optically dense media such as a cloud or turbid water, this assumption breaks down. For sufficiently narrow laser divergence and receiver field of view, it is still possible to observe primarily single scattered photons. In a simulation, it is possible to separate returned photons by scattering order, returned angle, and exact range. This permits analysis of different types of scattering trajectories.

The easiest scattering order to analyze is the first order. These photons are ones that undergo exactly 180° backscattering. For scattering from spherical particles with linear incident polarization, the returned light will have the exact same polarization as the transmitted light; spherical particles do not depolarize incident linear polarization. Particles of different shapes and orientations will however depolarize perfectly backscattered light so depolarization is often used, for example, to differentiate water clouds from ice-crystal clouds. As the optical depth increases, more total light is reflected but this light is also concentrated near the detector, the high optical density attenuates the signal as photons are scattered away from their direct path. The total range of the single-scattered photons also stops directly at the cloud boundaries.

As the field-of-view of the receiver is increased, the receiver becomes sensitive to multiple-scattered photons. As the field of view increases, more light is allowed into the detector making a mist-cloud appear brighter than a single-scattering assumption would predict. The cloud also appears to extend beyond its physical boundary due to photons rattling around inside the cloud, taking more time to return to the detector.

Once photons are multiply scattered some depolarization can occur, and the best way to view this is by opening the field-of-view. For a fixed wide field-of-view and spherical particles, separating returns which are co- and cross-polarized to the transmitted photons illustrate the change in depolarization due to multiple scattering. The co-polarized returns will include both single- and multiple-scattered photons while the cross-polarized signal will only come from multiple scattering. When more scattering occurs more of the returned light is depolarized. The single-scattering events are dominant throughout the range but the higher order terms become increasingly important at larger ranges. This is very dependent on the total field of view and total optical depth.

Multiple-field-of-view (MFOV) lidars may be used to analyze multiple scattering effects. These systems have methods to quickly vary the field of view of the receiving telescope to capture signals as a function of range on a short enough timescale to not be confused by changes in cloud structure. One way that this works in practice is to use a rotating disk that has different sized-holes drilled at a constant radius as the field stop in a telescope. As the disk rotates, different sized holes lead to different fields of view and by timing the rotation of the disk to the firing of the laser it is possible to record very quickly signals for different FOVs.

The need for multiple field-of-views is to analyze how the lidar pulse spreads transverse to its initial direction. In the total signal observed, the small particles have a strong single-scattered return at the smallest FOV, due to the wide shape of the phase function, the cross-polarized signal comes back from a very high FOV angle. For the large particles, due to the low backscatter in the phase function, the single scattered signal is a much lower percentage of the total signal. Also due to the very tight forward peak of the phase function much more cross-polarized signal comes from the lower FOV than in the small particle case.

The way in which the laser pulse spreads through the cloud depends on the extinction coefficient and the particle size so the goal of a MFOV inversion scheme is to extract these two parameters. From these parameters other physical quantities of interest such as liquid water content (LWC) and broadband extinction can be derived. When designing a MFOV lidar system, the choice of field-of-views is essential for gathering information.

S The earliest method used to evaluate multiple scattering was to take a ratio of the returns from the cross- and co-polarized channels called the linear depolarization ratio:

$$\delta = \frac{I_\perp}{I_\parallel}$$

Very generally, the more multiple scattering, the higher this ratio will be. As discussed in earlier sections, this ratio will be dependent on the experimental parameters such as FOV and particle size/density etc. Another metric which encapsulates similar information is the linear polarization contrast:

$$\delta_{LPC} = \frac{I_\parallel - I_\perp}{I_\parallel + I_\perp}$$

The linear polarization contrast is constrained to lie between −1 and 1 whereas the depolarization can take on any value greater than 0 (but is generally less than 1). As light travels through the cloud and scatters more than once, the depolarization will increase and the linear polarization contrast will decrease. For unpolarized light, or equal quantities of co- and cross-polarized signal, $\delta_{LPC}=0$. The light returned in the smallest field of view maintains the initial linear polarization since this light is scattered only once before returning to the receiver. As the FOV increases $\delta_{LPC}$ decreases, reaching a value of 0 beyond the physical boundary of the cloud.

Further, the azimuthal variation in the phase function suggests that there will be an azimuthal variation in the returned polarization patterns; the light in the two different polarization channels comes from different places in the cloud. From simulations, the initial polarization is horizontal, and the majority of the scattering is perpendicular to the initial polarization plane, as expected from the forms of the phase functions. The co-polarized signals show a two-fold symmetry around the polarization plane. The four-fold symmetry is present in the cross-polarized signals. These patterns have been analyzed semi-analytically and can be explained by the conservation of angular momentum of light. This semi-analytical work has shown that there is information in these patterns regarding important microphysical properties of the cloud.

By comparing the co-polarized patterns returned from the small-particle cloud and from the large-particle cloud it is clear that there is some information on the particle size as the co-polarized signals are quite different. Part of the problem with these azimuthal measurements is the difficulty in experimentally recording these patterns as a function of range into a cloud. Most measurements made so far involve very wide range-bins that typically include an entire cloud depth and so influences due to variations in particle size and concentration are integrated over and difficult to separate. Gated intensified charge coupled devices (ICCDs) have allowed for this type of analysis.

In order to understand how the azimuthal patterns will evolve as a function of range through the cloud it helps to first investigate the azimuthal patterns due solely to second-order scattering. From simulations, the scattering from small particles shows a large difference between the full patterns and the second-order patterns which is because of contributions from higher scattering orders. The large particle full patterns on the other hand are quite similar to the second order patterns. The phase function for the large particles is heavily peaked in the forward direction meaning that photons leave the cloud after fewer interactions than they do in the small-particle case. This means that optical depth does not always track well with the number of scattering events.

For the azimuthal dependence of the co- and cross-polarized signals, Semi-analytic methods to interpret doubly-scattered photons suggest that the azimuthal dependence of the cross-polarized returns should follow a 1−cos(4φ) dependence. This suggests that these signals can be fit to an equation of the form:

$$I(\varphi) = A + B\cos(4\varphi)$$

where A>0 and B<0. The ratio between minima and maxima can then be defined as:

$$R = \frac{I_{min}}{I_{max}} = \frac{A+B}{A-B}$$

The ratio for double-scattered photons would be zero. Higher order scattering will blur the strong azimuthal patterns. This contrast may be used to correlate the azimuthal contrast of the cross-polarized channel to the optical depth. The change in contrast comes about through multiple scattering so perhaps a better way to analyze it is to correlate the contrast with number of scattering events.

Rather than take the contribution of all photons or only double-scattered photons, it is possible to sort the returned photons into range-bins and thereby fit the azimuthal dependence as a function of range. For all particles, as the range into the cloud increases the ratio increases from near-zero at the cloud boundary to higher values deeper into the cloud. The difference between the particles comes about because the number of scattering events in clouds with the same optical density is lower for large particles. This is because of the highly-forward-peaked nature of the phase function for scattering from large particles. The azimuthal contrast ratio compares very well to the average multiple-scattering number, up to around three scattering events. By using the azimuthal contrast ratio we can determine whether most particles in a given range-bin have been single-, double-, or triple-scattered.

This connection between number of scattering events and azimuthal contrast can be used also to measure the optical depth of the medium. Measuring the azimuthal contrast of the cross-polarized signal is a good measure of the optical depth of the cloud. Note that this will change for different particle sizes because of the propensity for large particles to primarily scatter in the forward direction.

Given the difference in co-polarized images for scattering from particles with different size parameters, the co-polarized azimuthal contrast can be fitted to a form:

$$I(\varphi) = A + B \cos(2\varphi) + C \cos(4\varphi)$$

A contrast which measures the intensity difference in two- and four-fold patterns can be defined as $$R = \frac{C+B}{C-B}$$

This ratio shows a clear relation to particle size. This method has further promise for providing an additional measure of particle size independent from measures of optical density.

As such, the sub-pulse width resolution technique using a lidar system according to an embodiment can be used to exploit these attributes of multiple scattering to characterize turbid media. In an embodiment, one method is an invasive approach where a target is lowered into the liquid media serving as a scattering target for the lidar. Frequent recordings of high-precision range and intensity of the backscattered signal as the target is lowered through the liquid is then afforded by the sub-pulse width resolution technique using the lidar system. A highly precise range profile of backscattered intensity through the liquid column can be determined, enabling estimates of the extinction coefficient of the turbid media and an overall determination of optical depth.

In an alternate embodiment as opposed to the invasive measurement as described above, another method is a non-invasive measurement of the depolarization ratio of the turbid media. Multiple scattering by suspended particles will modify the original polarization, quantified by the amount of depolarization, that allows for differential detection of single- and multiple-scattered photons from optically dense media. The optical depth of a clouded or of turbid liquid media can then be determined by measuring the amount of depolarization of the returned lidar pulse, as long as the field-of-view of the receiver is large enough to observe multiple scattering. As the laser pulse penetrates the optically dense media, it is depolarized by multiple scattering. The number of scattering events is related to the total optical depth (or the optical depth at a given range), which can then be relate to the amount of depolarization to the optical depth of the medium.

Furthermore, the observed angular spread of the returned multiple-scattered light is related to the size of the particles and differs spatially for different planes of polarization. By taking measurements using the sub-pulse width resolution technique using the lidar system with different fields-of-view, it can be worked out how the lidar pulse is spreading laterally through the medium, which then informs on the mean particle size distribution of the suspended particulates. Combining the depolarization measurement with the multiple field-of-view measurement can serve to identify two important parameters of turbid media: optical depth and particle size. A way to capture simultaneous returns within multiple fields of view is to image the multiple scattered signal on a planar imaging array. In an embodiment, 5-6 different fields-of-view may be needed. In another embodiment, the suitable number of fields-of-views would be highly dependent on chosen parameters such as cloud distance, cloud depth, particle density, particle size, etc.

Compact and scalable sensor arrays with each pixel registering its own signal are available in. e.g., silicon photomultipliers. As each sensor pixel represents a physical location of the scattered signal from a target, the lateral spreading caused by multiple scattering in turbid waters can be determined. In an embodiment, this system configuration may be realized in a lidar system. For example, PMT detectors 435 and 436 in the lidar system 400 (as discussed with respect to FIG. 4) may be replaced with silicon photomultiplier arrays or other sensor arrays.

Particularly, in an embodiment, a charge couple device (CCD) camera may be used for capturing the scattered signal. However, traditional CCD cameras may not have the time-sensitivity that would allow for range-resolved measurements. The use of gated intensified CCD (ICCD) cameras may overcome this issue as ICCD cameras have the capability to be gated in time, allowing for the measurement of very narrow (ns) time slices. For each laser shot, only a single time slice could be measured and many laser pulses would have to be integrated to produce a final image for that particular time slice. Measurement in this way of a full depth profile could be time consuming depending on the signal levels returned from the cloud.

In another embodiment, the use of a spatial mask placed at a focal plane of the receiver may allow for measurement of azimuthal signal. Light that passes through the mask would all be focused onto a single-element detector such as a photomultiplier tube (PMT) or a photodiode. This spatial mask could be designed to isolate different parts of the expected pattern, allowing for measurements of the contrast. By rotating in different spatial masks into co- and cross-polarized channels and relying on symmetries present in the images, determination of azimuthal contrast would be possible. This method may allow for at least an imperfect measure of the contrast which will in turn provide information on the optical depth of the medium.

In yet another embodiment, a similar mask can be created for measuring the co-polarized variations, although designing the mask is somewhat trickier due to the subtle differences in scattering profiles between particles of different sizes. The larger particles lead to a much stronger peak along the horizontal axis ($\varphi=0°, 180°$) compared to smaller particles. With more realistic (larger) droplet sizes, these differences could change significantly.

Thus, a non-invasive, lidar remote-sensing technique for determining optical depth and particle size in turbid media can be developed by exploiting the effects of multiple scattering and using the sub-pulse width resolution technique using the lidar system according to an embodiment to determine detailed estimates of depolarization and angular spreading. In another embodiment, by combining the invasive and noninvasive approaches, using the lidar technology, a calibration procedure can be developed that relates the remote observation of optical depth and particle size with the invasive measurement of extinction and optical depth.

Referring to FIG. 8, the lidar system 800 in an alternate embodiment incorporating the features as discussed above for detecting and characterizing targets with sufficiently large optical density that produces multiple scattering effects in the media. The lidar system 800 may be modified from the lidar system 400 by replacing the PMTs 435 and 436 with sensor arrays 835 and 836. In an embodiment, the field stop 832 may be further opened (or completely opened) compared to the field stop 432 for a larger field-of-view for observing the multiple scattering light. In a further embodiment, the processor 843 may include processes, algorithms, and/or other calculations as calibrated to the lidar system 80X) for determining data and information related to the multiple scattering effects in the media, for the invasive approach, the noninvasive approach, and/or a combination of the invasive and noninvasive approaches. In one embodiment, multiple fields of view can be obtained simultaneously or substantially simultaneously.

In further detail, the lidar system 800 includes light transmitter 810, light receiver 830, and timing electronics 840. In this embodiment, the light transmitter 810 includes laser 812, beam expander 813, half-wave plate 814, polarizer 815, and prisms 816. Laser 812 acts as a light source for lidar system 800 and is configured to emit a focused light as the basis of the transmitted light signal. Laser 812 can be a pulsed laser, continuous wave (CW) laser, polarized laser, or other types of lasers. In other embodiments, laser 812 can generically include other light sources as known in the art (i.e., lamp or LED light). In one embodiment, a 850 ps pulsed laser is used as laser 812. Beam expander 813, half-wave plate 814, polarizer 815, and prisms 816 are optional and are configured to focus and align the transmitted light signal towards target 820. In this embodiment, the chain of beam expander 813, half-wave plate 814, polarizer 815, and prisms 816 are each aggregated and aligned to the optical path of the transmitted light signal. Beam expander 813 is configured to expand the transmitted light signal for tight spot targets. Half-wave plate 814 may be mechanically or electrically (i.e., using a liquid crystal variable retarder) operable to control the retardance of the focused light signal along the optical path. Polarizer 815 is configured to polarize the light signal with a known polarization. A polarizing laser may also be used as laser 812 for a known polarization. Prisms 816 are configured to coaxially direct the transmitted light signal to target 820 as known in the art.

In operation, trigger 811 may be electrically coupled to laser 812 or other components of light transmitter 810 to start the transmission of the light signal. In other embodiments, light transmitter 810 may operate continuously without trigger 811. Light signal is transmitted from light transmitter 810 to target 820. Target 820 includes at least a first surface and a second surface as described herein. The transmitted light signal is partially scattered from the first surface as a first scattered light signal and partially refracted into the target. The refracted light is scattered from the second surface as a second scattered light.

The first scattered light signal has substantially the same polarization as the transmitted light signal while the second scattered light signal will have a different polarization due to the scattering from the second surface. The first and second scattered light signals may have an overlapped interpulse portion forming one combined scattered light signal.

Light receiver 830 includes telescope 831, field stop 832, spectral filter 833, splitting polarizer 834, first detector 835, and second detector 836. Each of these components are aggregated and aligned to an optical path of the scattered light signal. Telescope 831 acts to collect the scattered light signal. Field stop 832 and spectral filter 833 are optional components. Field stop 832 acts to limit the field of view of light receiver 830 where the scattered light signal would be gathered. In this embodiment, field stop 832 may have a wider field-of-view than field stop 432 or may be completely open. Spectral filter 833 acts to further filter the received light to the light spectrum of interest (e.g., limiting the spectrum to the expected frequency of the scattered light signals).

Splitting polarizer 834 acts to separate the received scattered light signal according to the polarization. In this embodiment, the polarization splitter 834 is aligned with the optical path of the scattered light signal. As scattered light signal reaches polarization splitter 834, the cross-planar polarized component of the signal substantially passes through polarization splitter 834 while the co-planar polarized component of the signal substantially reflects. The angle of reflection is a function of the type of polarizer used (i.e. 90° angle or 62° angle for a Glan Taylor polarizer). Here, the first scattered light signal scattered from the water surface containing cross-planar polarized light is substantially reflected (i.e., at a 90° angle) while at least the co-planar polarization component of the second scattered light signal scattered from the water floor containing depolarized light is substantially transmitted. Other orientations are also possible depending on the polarization methodology used on the transmitted light signal and the type of polarizer used for polarization splitter 834.

Detector 835 is positioned at a 180° optical path from the reflected light signal and configured to detect the cross-planar polarization component of scattered light signal. Detector 836 is positioned at the optical path of the reflected light signal (i.e., 900) and is configured to detect the co-planar component of the scattered light signal. Detectors 835 and 836 may each include a sensors array e.g., silicon photomultipliers, for detecting scattered signal from the target (e.g., multiple scattered light signal).

It is noted that polarizing beam splitter 834 can be positioned at a variety of angles to split the scattered light signal at other angles. Detectors 835 and 836 can be positioned at other configurations to receive such split components of the multiple scattered light signals.

The timing electronics 840 may include a constant fraction discriminator (CFD) 841, time-to-digital converter (TDC) 842, and processor 843. Processor 843 is coupled to CFD 841 and TDC 842 through a control line for control and feedback of these components. CFD 841 is coupled to detectors 835 and 836 through a signal conditioning line and is configured to output an apex of the photon count signal at certain intervals representing the time at which the signal has meaningfully arrived. In one embodiment of the invention, CFD 841 has an 8 ns resolution. TDC 843 is coupled to CFD 841 and is configured to convert the time signal output by CFD 841 into a digital signal. In one embodiment of the invention, TDC 842 has a resolution of 27 ps.

Processor 843 is coupled to TDC 842 and is configured to take the digitized timing signal and determine the time of arrival of each component (co-planar and cross-planar polarized signals in one embodiment) and calculate the difference in the time of arrival of the two signals. In this embodiment, the processor 843 may further include processes, algorithms, and/or other calculations as calibrated to the lidar system 800 for determining data and information related to the multiple scattering effects in the media, for the invasive approach, the noninvasive approach, and/or a combination of the invasive and noninvasive approaches.

Further, an initial calibration to lidar system 800 may be needed because the light paths to detectors 835 and 836 may not be the same after the scattered light is separated by polarizing splitting 834. According to one embodiment, this calibration can be accomplished by using a scattered signal from a surface that is depolarizing and noting a difference in the assessment of distance to that surface between the detectors 835 and 836. The difference in the assessment of distance is likely due to the slightly different optical paths between each of detectors 835 and 836 and polarizing splitter 834. In one embodiment, this calibration can be performed once and saved for adjustment by processor 843. The correction and adjustment can be applied to subsequent depth data by processor 843.

EXAMPLES

Without intending to limit the scope of the invention, the following examples illustrate how various embodiments of the invention may be made and/or used.

Example 1

Figure 6A:
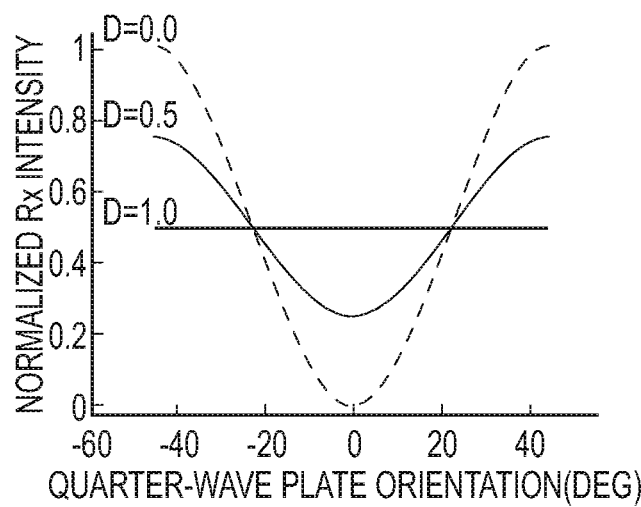
FIG. 6A illustrates the normalized received intensity of light for targets of varying degrees of depolarization.

A simulation of the normalized received intensity for targets of varying degrees of depolarization d is illustrated in FIG. 6A. The sinusoidal nature of received light from a polarization preserving target 513 (curve labeled d=0) is evident, while the detector 536 registers a constant intensity of 0.5 for a completely depolarizing target 513 (curve labeled d=1). By translating the quarter-wave plate 528 from an orientation θ of π/4 radians to θ of 0 radians, scattered signals are modulated between polarized water surface and volume of the water body returns and depolarized floor returns.

Bathymetric measurements were made at the University of Colorado, Boulder, using a lidar system 504 as illustrated in FIG. 5. The transmitter consisted of a CW-diode pumped, passively Q-switched Nd:YAG microchip laser. The laser outputs 2.45 microjoule of linearly polarized 532 nm light at a repetition rate of 14 kilohertz and pulse width of 450 picoseconds. A half-wave plate aligned the laser 508 light polarization to the vertical transmission plane of a 532 nm PBS. Light exiting the PBS was transmitted through a rotatable quarter-wave plate toward a controlled target consisting of a column of water on top of a polarization-altering floor substrate. Scattered laser light received by the instrument was collected with a detector comprising a photomultiplier tube in photon counting mode. The output PMT voltage was analyzed on an oscilloscope with 550 ps timing resolution and stored for post-processing.

Figure 6B:
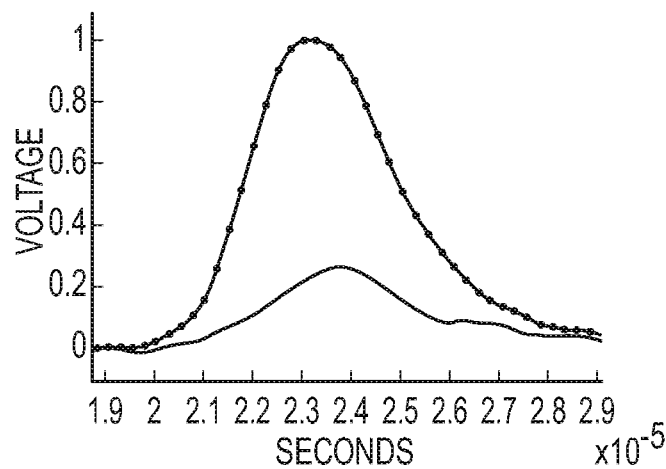
FIG. 6B illustrates normalized detector voltage data acquired during the reception of backscattered signals using an analog system for the water surface (dotted) and floor (solid)

Data acquired during reception of scattered signals from the target for 3 centimeter deep water as measured physically, are presented in FIG. 6B. The quarter-wave plate was positioned in θ orientations of π/4 and 0 radians. The received intensity from the PMT analog signal illustrates reduction of polarized signals from the water (dotted-solid) when the quarter-wave plate fast axis is aligned to the vertical PBS polarization transmission plane to measure polarization-altered floor signals (solid).

Figure 6C:
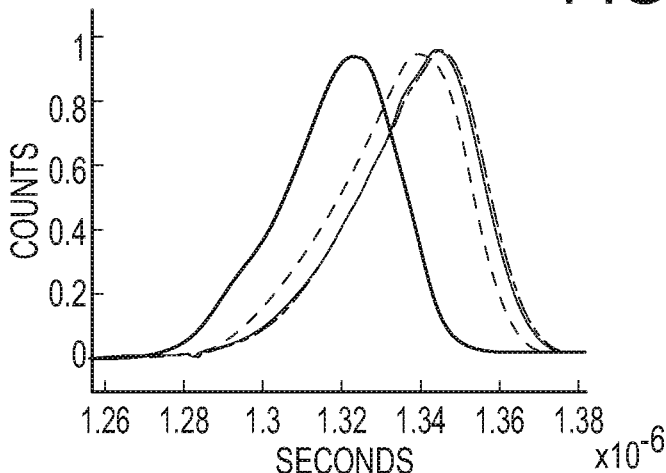
FIG. 6C illustrates normalized timing data acquired during the reception of scattered surface and floor signals using a digital system for 3 centimeter water depth (solid) and 1 centimeter water depth (dashed)

The experiment was repeated using a digital lidar receiver with 27 picosecond timing resolution, as illustrated in FIG. 6C. To illustrate the ultimate resolution of the timing unit, data were again taken for 3 centimeter (solid) and 1 centimeter (dashed) water depths.

Taking into account the refractive index change of water n relative to air, water depth h is calculated as:

$$h = \frac{c \Delta t}{2n} \quad (8)$$

where the time delay $\Delta t$ is evaluated by differencing the FWHM points (horizontal dashed) of the surface and floor curve trailing edges. The results presented in FIG. 6C produced depth measurements d of 2.7 cm and 1.2 cm. The 27 ps resolution of the timing unit imposes a ±3 mm uncertainty on the water depth estimate. Therefore, the observed depths are well within the uncertainty of the measurement.

Transmission of vertically polarized light through the PBS and translation of the quarter-wave plate orientation modulates received signals between polarization preserving water surface and body returns and polarization-altered floor scatter. By removing water surface and column effects through polarization modulation, bathymetric ambiguities between water surface and body floor returns are negated. As a result, the fundamental lower limit on shallow water bathymetry imposed by system bandwidth limitations is reduced beyond traditional techniques using a single detection channel. The technique presented here has demonstrated resolution of 1 cm water depth.

Although embodiments described above discuss the inclusion of a light source comprising a laser, it should be appreciated that the light source is not required to comprise a laser. Moreover, transmission and reception of light may be through separate apertures. According to such embodiments, a polarizing beam splitter need not be included. For example, the reception channel can instead include a filter or other polarization discrimination element. Moreover, although examples have discussed the transmission of light having particular polarizations, other polarizations can be used. In particular, it is sufficient to transmit polarized light, and receive polarization-altered light for discriminating polarization preserving and polarization-altering scattered light. In addition, although methods and systems herein have discussed the disclosed polarization techniques in connection with lidar, embodiments of the present invention also have application to guided wave optics, optical time domain reflectometry, fiber optic sensor networks, and/or other applications as known now or may be later derived.

Example 2

Figure 7:
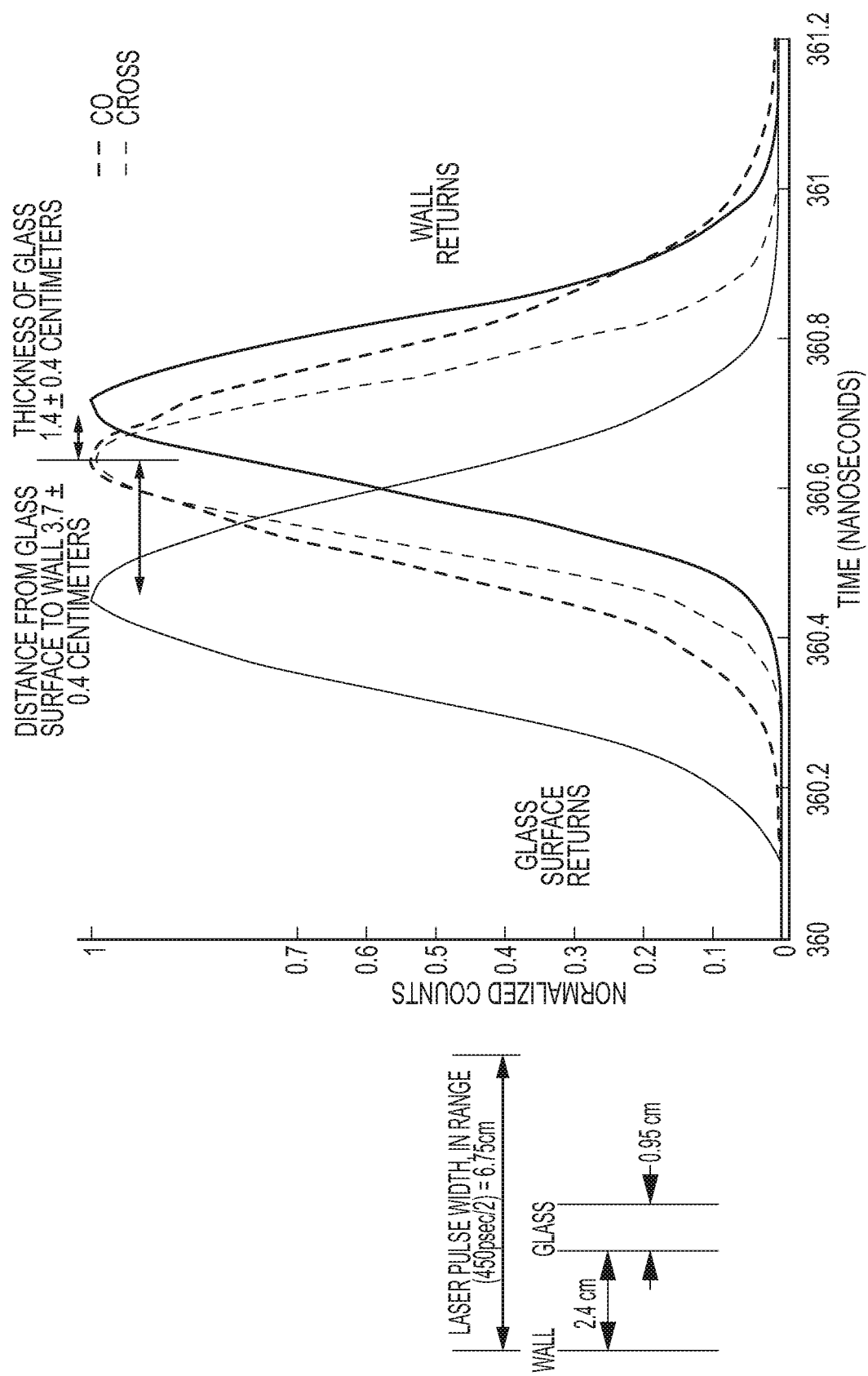
FIG. 7 illustrates the measurement of depth of semi-transparent media with sub-pulse width resolution.

FIG. 7 illustrates the result of an experimental setup measuring depth of semi-transparent media with sub-pulse width resolution. Here, a laser pulse width of 450 ps was used, corresponding to a pulse length (range) of 6.75 cm. A piece of glass with polarization preserving and semi-transparent surfaces and with a thickness of 1.4 cm was placed in front of a polarization-altering (depolarizing) wall at a distance of 3.4 cm. A lidar system, similar to lidar system 400 according to one embodiment of the invention, was placed at a distance of 30 m from the media.

First, a control measurement was made with the piece of glass removed. The dotted lines in the graph show the relative distance of the wall from this control measurement. Both the co-planar and cross-planar polarization components in this measurement are scattered from the wall and register the same distance after being calibrated (dotted lines).

Next, a measurement is made with the glass setup as described. The solid lines in the graph show the relative distance of the glass and the wall from this measurement. The co-planar polarization component is scattered from the glass surface. The cross-planar polarization component is produced by scattering from the wall. The distance from the glass surface to the wall can then be determined based on previous embodiments of the invention. Further, in this measurement, the cross-planar polarization component scattered from the wall is further delayed by the refraction index of the glass. Therefore, a measurement on the thickness of the glass can also be determined by this delay in this second measurement.

Both the distance from the glass surface to the wall and the thickness of the glass can be determined using both the measurements from the control experiment and with the glass setup. For the distance of the glass first surface to the wall, since the cross-planar polarization component is scattered off the glass surface in the experiment with the glass setup, the distance is the difference between the wall measurements in the control experiment and the cross-planar polarization component in the experiment with the glass setup. The calculated distance is 3.7 cm±0.4 cm (actual measured distance from wall to first glass surface is 3.4 cm±0.1 cm). For the thickness of the glass, since the co-planar polarization component is scattered off the wall in the experiment with the glass setup and further includes the delay by the refraction index of the glass, the thickness is the difference between the wall measurements in the control experiment and the co-planar polarization component in the experiment with the glass setup. The calculated thickness is 1.4 cm±0.4 cm. Comparing the result of the calculated distance (3.7 cm) and thickness (1.4 cm) with the pulse width of the laser (6.75 cm), both the distance and the thickness measurements are confirmed to be at sub-pulse width.

Example 3

FIG. 8 illustrates the result of an experimental setup measuring water quality with sub-pulse width resolution. Here, the lidar system operating at 532 nm was positioned 7 ft above a tank of water and pointed down into the water. The tank of water also contained 1.5 cu. ft. of sand, which could be stirred up in order to introduce turbidity into the water. The water was 25 cm deep above the sand bottom surface. This experimental setup demonstrated that the invasive lidar technique is able to measure extinction through turbid media First, a second green laser system was used to determine the vertical distribution of turbidity in the water to check on the uniformity of the turbidity through the water column. This laser system was directed horizontally through the water tank to a detector to record the intensity of light that passed through the water. As the density of suspended sand was increased through stirring, the detector sensed a large decrease in laser light that was transmitted through the water. By vertically translating this horizontally oriented laser/detector system, it was confirmed that the amount of transmitted light was independent of the vertical position of this laser on the time scale of a few minutes. This suggests that the density of suspended sand was independent of vertical position and uniformly distributed through the water column.

Second, the sub-pulse width resolution technique using a lidar system according to an embodiment was applied to the fully mixed turbid water by positioning the lidar above the tank. A scattering target (a block of wood) was attached to a rod and progressively lowered into the tank of turbid water. At 2 cm intervals the target was held steady in the water, and the peak intensity of the backscattered laser light off the target was recorded on an oscilloscope, bypassing the acquisition system described in FIG. 4 (e.g., CFD 441 and TDC 442) and FIG. 8 (e.g., CFD 841 and TDC 842) in order to achieve a more direct measurement of the intensity.

As the scattering target was lowered deeper into the water, the returned signal decreased due to the turbidity level of the water. Using a narrow field-of-view and observing the change in intensity with range, a two-way extinction measurement of $k=0.25$ cm$^{-1}$ was calculated by fitting the measurements to an exponential function $e^{-kx}$, as seen in FIG. 8. This two-way extinction coefficient corresponds to a one-way extinction through the water of $k=0.25/2=0.125$ cm$^{-1}$. This is much larger than the absorption coefficient of water for the 532 nm laser light (~0.001 cm$^{-1}$), indicating that the extinction observed is largely due to the scattering of light from the suspended fine-grain sand present in the water. This measurement provides a direct means of determining the level of turbidity of the water and can be used as important information in determining the multiple scattering attributes of optically dense media.

Accordingly, the present invention has been described with some degree of particularity directed to the exemplary embodiments of the present invention. It should be appreciated though that modifications or changes may be made to the exemplary embodiments of the present invention without departing from the inventive concepts contained herein.

What is claimed is:

1. A method of using a LIDAR apparatus, the method comprising:
   generating a polarized signal;
   applying at least some portion of the polarized signal onto a semi-transparent media;
   receiving two or more scattered signals from the semi-transparent media, wherein there is an ambiguous interpulse overlap between the two or more received scattered signals;
   separating the two or more received scattered signals into a first component and into a second component to remove the ambiguous interpulse overlap between the received two or more scattered signals;
   determining one or more characteristics of the separated first component and the separated second component; and
   determining, with computational equipment based on the one or more of the characteristics of the separated first component and the separated second component, one or more of: i) optical depth of a portion of the semi-transparent media, ii) physical depth of the semi-transparent media, iii) optical purity of the semi-transparent, and iv) topography characterization of the semi-transparent media.

2. The method of claim 1, wherein the polarized signal is generated from a laser or a light emitting diode (L.E.D.).

3. The method of claim 2, wherein the laser comprises at least one of a polarized laser, a pulsed laser, and a continuous wave (C.W.) laser.

4. The method of claim 1, wherein the polarized signal comprises electromagnetic radiation.

5. The method of claim 1, wherein the polarized signal comprises a polarized light signal.

6. The method of claim 1, wherein the one or more characteristics of the first component and the separated second component comprises information indicative of one or more of: (i) a frequency of the first component, (ii) a frequency of the second component, (iii) an amplitude of the first, (iv) an amplitude of the second component, (v) a phase of the first component, (vi) a phase of the second component, (vii) a polarization of the first component, and (viii) a polarization of the second component.

7. The method of claim 1, wherein the one or more characteristics of the first component and the separated second component comprises information indicative of one or more of: (i) an orientation of the first component and the second component, (ii) an angular spread of the first component and the second component, (iii) a degree of polarization of the first component and the second component, (iv) an azimuthal polarization pattern of the first component and the second component, (v) a high order scattering profile of the first component and the second component, and (vi) a range of a respective property being one of the properties (i) to (vi).

8. The method of claim 1, wherein the semi-transparent media comprises a first surface and a second surface.

9. The method of claim 8, wherein the topography characterization of the semi-transparent media comprises a topography of the first surface and topography of the second surface.

10. The method of claim 9, wherein the first surface comprises a water surface and the second surface comprises a submerged surface.

11. The method of claim 10, wherein the physical depth of the semi-transparent media comprises a relative distance between the water surface and the submerged surface.

12. The method of claim 1, wherein the optical purity of the semi-transparent comprises a water quality measurement.

13. The method of claim 1, wherein the semi-transparent media is one or more of a soft target or a hard surface.

14. The method of claim 1, wherein the first component and the second component comprise one or more of a cross-planar polarization component and a co-planar polarization component.

15. The method of claim 1, wherein the topography characterization of the semi-transparent media is a bathymetry characterization.

* * * * *